(12) United States Patent
Ko

(10) Patent No.: US 12,469,862 B2
(45) Date of Patent: Nov. 11, 2025

(54) FUEL CELL

(71) Applicants: HYUNDAI MOTOR COMPANY, Seoul (KR); KIA CORPORATION, Seoul (KR)

(72) Inventor: Hyun Woong Ko, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 567 days.

(21) Appl. No.: 17/960,931

(22) Filed: Oct. 6, 2022

(65) Prior Publication Data

US 2023/0246206 A1    Aug. 3, 2023

(30) Foreign Application Priority Data

Feb. 3, 2022    (KR) .................. 10-2022-0014077

(51) Int. Cl.
| | |
|---|---|
| *H01M 8/04007* | (2016.01) |
| *H01M 8/04223* | (2016.01) |
| *H01M 8/04701* | (2016.01) |
| *H01M 8/10* | (2016.01) |
| *H01M 8/241* | (2016.01) |
| *H01M 8/2465* | (2016.01) |

(52) U.S. Cl.
CPC ... *H01M 8/04037* (2013.01); *H01M 8/04701* (2013.01); *H01M 8/241* (2013.01); *H01M 8/2465* (2013.01); *H01M 2008/1095* (2013.01); *H01M 2250/20* (2013.01)

(58) Field of Classification Search
CPC ......... H01M 8/04037; H01M 8/04701; H01M 8/241; H01M 8/2465; H01M 2008/1095; H01M 2250/20; H01M 8/0202; H01M 8/04067; H01M 8/04268; H01M 8/04074; H01M 8/0267; H01M 8/248
USPC ........................................................ 429/433
See application file for complete search history.

(56) References Cited

U.S. PATENT DOCUMENTS

| | | | |
|---|---|---|---|
| 8,865,365 B2 | 10/2014 | Otake et al. | |
| 2017/0331126 A1* | 11/2017 | Gu | H01M 8/04037 |
| 2017/0352900 A1* | 12/2017 | Kim | H01M 8/04225 |
| 2018/0020506 A1* | 1/2018 | Jang | H01M 8/04253 |
| 2020/0185732 A1* | 6/2020 | Nam | H01M 8/24 |

FOREIGN PATENT DOCUMENTS

| | | |
|---|---|---|
| CN | 104584296 B | 12/2017 |
| EP | 2787580 B1 | 10/2015 |
| JP | 2010-192384 A | 9/2010 |
| JP | 2014-049383 A | 3/2014 |
| KR | 10-2017-0079023 A | 7/2017 |
| KR | 10-2018-0088095 A | 8/2018 |
| KR | 10-1960930 B1 | 3/2019 |

* cited by examiner

Primary Examiner — Christian Roldan
(74) Attorney, Agent, or Firm — Morgan Lewis & Bockius LLP

(57) ABSTRACT

A fuel cell according to the disclosure includes a cell stack including a plurality of unit cells stacked in a first direction, a plate disposed at on least one of two end portions of the cell stack, a heating element disposed between the at least one of the two end portions of the cell stack and the plate and including a first connector including a first terminal protruding in a second direction intersecting the first direction and coupled to the plate in the first direction, and a second connector including a second terminal coupled to the first connector in the second direction and electrically connected to the first terminal.

19 Claims, 28 Drawing Sheets

FUEL CELL

CROSS-REFERENCE TO RELATED APPLICATION

This application claims the benefit of Korean Patent Application No. 10-2022-0014077, filed on Feb. 3, 2022, which is hereby incorporated by reference as if fully set forth herein.

TECHNICAL FIELD

Embodiments relate to a fuel cell.

BACKGROUND

In general, a fuel cell includes a cell stack and a heater assembly. In winter, water freezes inside an end cell of the cell stack due to the low outdoor air temperature, and thus electricity is not generated in the end cell, thereby deteriorating the initial startup and power generation efficiency of the fuel cell. In order to solve this problem, the heater assembly serves to heat the end cell during initial startup. However, there is still a problem in that, when terminals for supplying power to the heater assembly are erroneously assembled and connected thereto, the heater assembly is not capable of heating the end cell.

RELATED ART DOCUMENT

Patent Document

SUMMARY

Accordingly, embodiments are directed to a fuel cell that substantially obviates one or more problems due to limitations and disadvantages of the related art.

Embodiments provide a fuel cell capable of stably supplying power to a heater assembly.

However, objects to be accomplished by the embodiments are not limited to the above-mentioned objects, and other objects not mentioned herein will be clearly understood by those skilled in the art from the following description.

A fuel cell according to an embodiment may include a cell stack including a plurality of unit cells stacked in a first direction, a plate disposed at on least one of two end portions of the cell stack, a heating element disposed between the at least one of the two end portions of the cell stack and the plate and including a first connector having a first terminal protruding in a second direction intersecting the first direction and coupled to the plate in the first direction, and a second connector having a second terminal coupled to the first connector in the second direction and electrically connected to the first terminal.

For example, the heating element may further include a heating part connected to the first connector and configured to generate heat. The first connector may be mounted to an edge of the heating part, and at least a portion of the first terminal may protrude further than the edge of the heating part in the second direction.

For example, the heating part may include a first surface facing the plate and a second surface facing opposite the first surface, and the first terminal may have an end contacting a terminal area located at a peripheral portion of the first surface. The first connector may further include a first body including a first portion having a recess formed therein to connect at least a portion of the terminal area to the first terminal in the first direction and a second portion having a first receiving recess formed therein to receive the opposite end of the first terminal protruding in the second direction, the second portion being adjacent to the first portion in the second direction, and an adhesive member inserted into the recess to fix the first body to the heating part.

For example, the opposite end of the first terminal may be located farther away from the first surface of the heating part than the end thereof in the first direction, and the first terminal may include a first terminal body connecting the end to the opposite end and disposed in the first body.

For example, the fuel cell may further include an insulation pad disposed on the first surface of the heating part so as to connect the at least a portion of the terminal area to the terminal area.

For example, each of the first portion and the second portion of the first body may be in contact with the insulation pad to trap the adhesive member in the recess.

For example, the second connector may be detachably coupled to the first connector.

For example, the plate may include a second receiving recess, receiving the first connector inserted thereinto in the first direction, and an insertion portion, allowing the second connector to be inserted into the first receiving recess of the first connector, received in the second receiving recess, from outside the plate in the second direction.

For example, the plate may further include a first area, which overlaps the first portion of the first body in the first direction, and a second area, which is disposed adjacent to the first area, overlaps the second portion of the first body in the first direction, and is stepped with respect to the first area to define the insertion portion. The first portion may have a third surface facing the first area, and the second portion may have a fourth surface facing the second area and stepped with respect to the third surface.

For example, the plate may further include an end plate and a heater plate disposed between the end plate and the at least one of the two end portions of the cell stack, and the second receiving recess may be included in the heater plate.

For example, the end plate and the heater plate may be integrated with each other.

For example, the second connector may further include a second body including a third portion, having a portion of a support portion and a third receiving recess defined from an end of the portion of the support portion in the second direction, and a fourth portion, having a remaining portion of the support portion and a fourth receiving recess defined from an end of the remaining portion of the support portion bent and extending in the first direction from the third portion. The second terminal may include a second terminal body including a first embedded portion, embedded in the portion of the support portion in the third portion, a first protruding portion, protruding from the first embedded portion in the second direction and received in the third receiving recess, and a connection portion, extending from the first protruding portion in the second direction and connected to the opposite end of the first terminal, and a third terminal body including a second embedded portion, bent and extending in the first direction from the second terminal body and embedded in the remaining portion of the support portion in the fourth portion, and a second protruding portion, protruding from the second embedded portion in the first direction and received in the fourth receiving recess.

For example, the second connector may further include a gasket disposed at the end of the portion of the support portion, which is contiguous with the third receiving recess in the third portion.

For example, the second portion of the first body may further include a first coupling portion, and the third portion of the second body may include a second coupling portion coupled to the first coupling portion in the second direction in a fitting manner.

For example, the first coupling portion may include a partition wall protruding in the second direction to define the first receiving recess and surrounding the opposite end of the first terminal, a first recess disposed near the partition wall, and a stepped portion disposed near the partition wall to define a second recess together with the plate. The second coupling portion may include coupling members defining the third receiving recess and coupled to the first recess and the second recess in a fitting manner.

For example, the fuel cell may further include a wire coupled to the second protruding portion in a female-male coupling manner.

For example, the wire may have an end portion coupled to the fourth receiving recess in a fitting manner.

For example, the wire may be integrated with the second connector.

For example, one of the first terminal and the second terminal may include a pair of male heater terminals protruding in the second direction, and the remaining one of the first terminal and the second terminal may include a pair of female heater terminals receiving the pair of male heater terminals inserted thereinto.

A fuel cell according to another embodiment may include a cell stack including a plurality of unit cells stacked in a first direction, a plate disposed at on least one of two end portions of the cell stack, and a heater assembly configured to generate heat to raise the temperature of the cell stack, at least a portion of the heater assembly being disposed between the at least one of the two end portions of the cell stack and the plate. The heater assembly may include a heating element, including a first connector, and a second connector, detachably coupled to the first connector to supply power to the heating element.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell 100 according to an embodiment will be described with reference to the accompanying drawings. The fuel cell 100 will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely. Hereinafter, for convenience of description, the +x-axis direction or the −x-axis direction will be referred to as a "first direction", the +z-axis direction or the −z-axis direction will be referred to as a "second direction", and the +y-axis direction or the −y-axis direction will be referred to as a "third direction".

Figure 1:
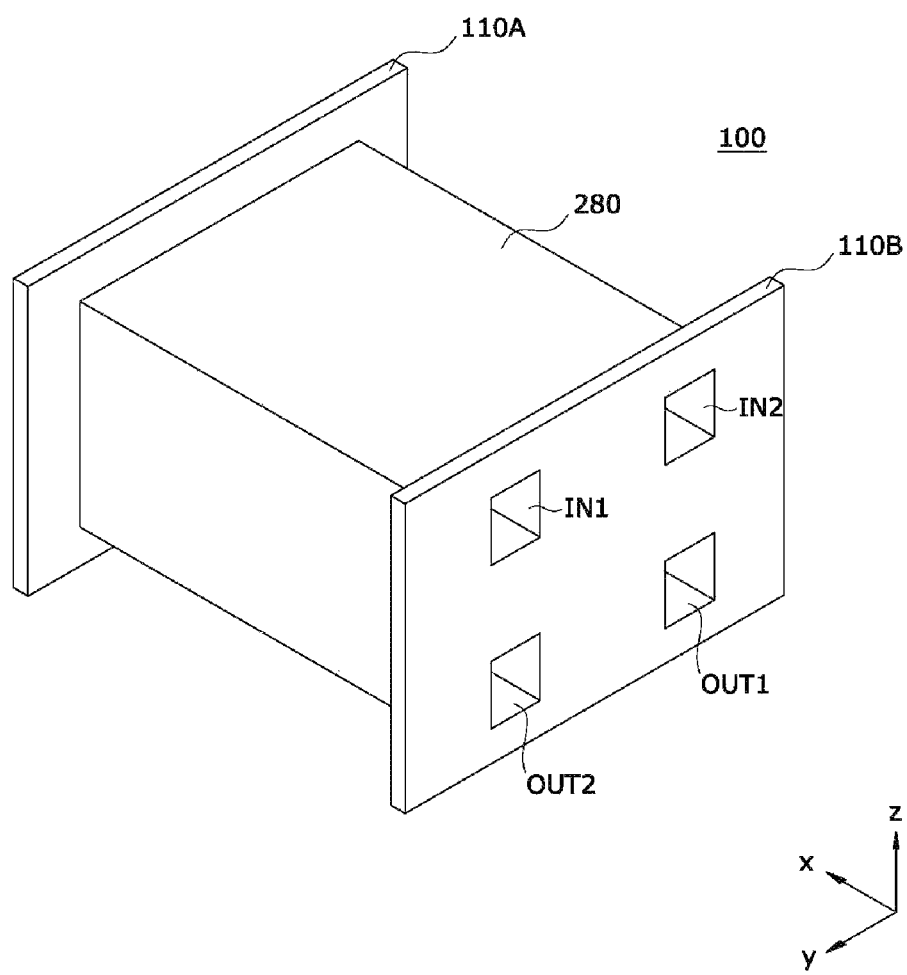
FIG. 1 is a perspective view showing the external appearance of a fuel cell according to an exemplary embodiment of the present disclosure.
Figure 2:
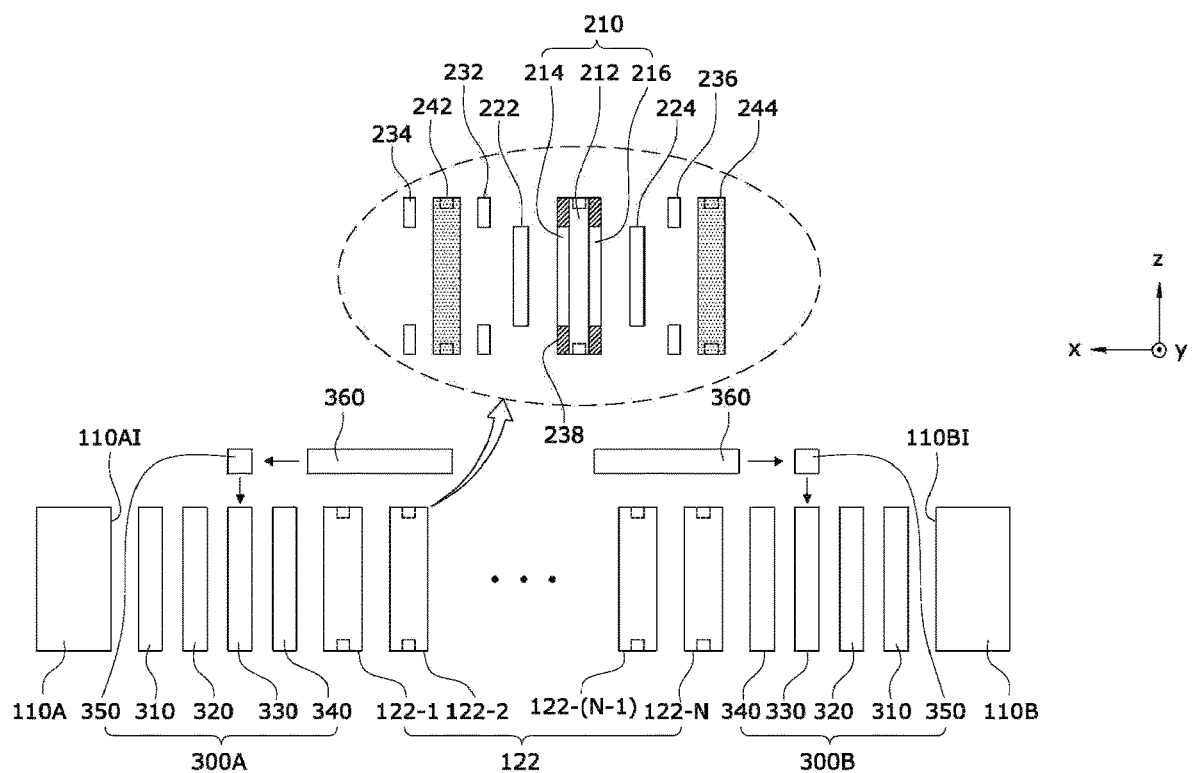
FIG. 2 is a cross-sectional view of the fuel cell according to the embodiment in FIG. 1.

FIG. 1 is a perspective view showing the external appearance of a fuel cell 100 according to an exemplary embodiment of the present disclosure, and FIG. 2 is a cross-sectional view of the fuel cell 100 according to the embodiment in FIG. 1. Illustration of the enclosure 280 shown in FIG. 1 is omitted from FIG. 2.

The fuel cell 100 may be, for example, a polymer electrolyte membrane fuel cell (or a proton exchange membrane fuel cell) (PEMFC), which has been studied most extensively as a power source for driving vehicles. However, the embodiments are not limited to any specific form of fuel cell 100.

The fuel cell 100 may include end plates (or pressing plates or compression plates) 110A and 110B, a cell stack (or a power generation module) 122, an enclosure 280, and first and second heater assemblies 300A and 300B.

The enclosure 280 shown in FIG. 1 may be coupled to the end plates 110A and 110B, and may be disposed so as to surround at least a portion of the side portions of the cell stack 122 that is disposed between the end plates 110A and 110B. The enclosure 280 may serve to clamp a plurality of unit cells together with the end plates 110A and 110B in the first direction. In other words, the clamping pressure of the cell stack 122 may be maintained by the end plates 110A and 110B and the enclosure 280, which have rigid body structures. However, the clamping pressure of the cell stack 122 may be maintained without using the enclosure 280. The embodiments are not limited to any specific configuration for maintaining the clamping pressure.

The end plates 110A and 110B may be disposed at respective ends of the cell stack 122, and may support and fix a plurality of unit cells. That is, the first end plate 110A may be disposed at one of the two end portions of the cell stack 122, and the second end plate 110B may be disposed at the other one of the two end portions of the cell stack 122.

The fuel cell 100 may include a plurality of manifolds M. The manifolds may include a first inflow communication portion (or a first inlet manifold) IN1, a second inflow communication portion (or a second inlet manifold) IN2, a third inflow communication portion (or a third inlet manifold) IN3 (not shown), a first outflow communication portion (or a first outlet manifold) OUT1, a second outflow communication portion (or a second outlet manifold) OUT2, and a third outflow communication portion (or a third outlet manifold) OUT3 (not shown).

One of the first and second inflow communication portions IN1 and IN2 may correspond to a hydrogen inlet through which hydrogen, which is a reactant gas, is introduced into the cell stack 122 from the outside, and the other one of the first and second inflow communication portions IN1 and IN2 may correspond to an oxygen inlet through which oxygen, which is a reactant gas, is introduced into the cell stack 122 from the outside. In addition, one of the first and second outflow communication portions OUT1 and OUT2 may correspond to a hydrogen outlet through which hydrogen, which is a reactant gas, and condensate water are discharged out of the cell stack 122, and the other one of the first and second outflow communication portions OUT1 and OUT2 may correspond to an oxygen outlet through which oxygen, which is a reactant gas, and condensate water are discharged out of the cell stack 122.

For example, the first inflow communication portion IN1 may correspond to a hydrogen inlet, the second inflow communication portion IN2 may correspond to an oxygen inlet, the first outflow communication portion OUT1 may correspond to a hydrogen outlet, and the second outflow communication portion OUT2 may correspond to an oxygen outlet. Alternatively, the first inflow communication portion IN1 may correspond to an oxygen inlet, the second inflow communication portion IN2 may correspond to a hydrogen inlet, the first outflow communication portion OUT1 may correspond to an oxygen outlet, and the second outflow communication portion OUT2 may correspond to a hydrogen outlet.

Further, the third inflow communication portion IN3 may correspond to a coolant inlet through which a cooling medium (e.g., coolant) is introduced from the outside, and the third outflow communication portion OUT3 may correspond to a coolant outlet through which a cooling medium is discharged to the outside.

The first and second outflow communication portions OUT1 and OUT2 may be disposed below the first and second inflow communication portions IN1 and IN2, the first inflow communication portion IN1 and the first outflow communication portion OUT1 may be disposed at positions separated from each other in a diagonal direction, and the second inflow communication portion IN2 and the second outflow communication portion OUT2 may be disposed at positions separated from each other in a diagonal direction. Due to this arrangement of the first and second inflow communication portions IN1 and IN2 and the first and second outflow communication portions OUT1 and OUT2, condensate water may be discharged from the lower portions of the unit cells included in the cell stack 122, or may remain in the lower portions of the unit cells due to gravity.

According to one embodiment, the first and second inflow communication portions IN1 and IN2 and the first and second outflow communication portions OUT1 and OUT2 may be included in any one of the first and second end plates 110A and 110B (e.g., the second end plate 110B, as shown in FIG. 1), and the third inflow communication portion IN3 and the third outflow communication portion OUT3 may be included in the other one of the first and second end plates 110A and 110B (e.g., the first end plate 110A shown in FIG. 1).

According to another embodiment, the first and second inflow communication portions IN1 and IN2 and the first and second outflow communication portions OUT1 and OUT2 may be included in any one of the first and second end plates 110A and 110B (e.g., the first end plate 110A, unlike what is shown in FIG. 1), and the third inflow communication portion IN3 and the third outflow communication portion OUT3 may be included in the other one of the first and second end plates 110A and 110B (e.g., the second end plate 110B).

According to still another embodiment, all of the first, second and third inflow communication portions IN1, IN2 and IN3 and the first, second and third outflow communication portions OUT1, OUT2 and OUT3 may be included in any one of the first and second end plates 110A and 110B.

Referring to FIG. 2, the cell stack 122 may include a plurality of unit cells 122-1 to 122-N, which are stacked in the first direction. Here, "N" is a positive integer of 1 or greater, and may range from several tens to several hundreds. "N" may be determined depending on the intensity of the power to be supplied from the fuel cell 100 to a load. Here, "load" may refer to a part requiring power in a vehicle that uses a fuel cell (hereinafter referred to as a "fuel cell vehicle").

Each unit cell 122-$n$ may include a membrane electrode assembly (MEA) 210, gas diffusion layers (GDLs) 222 and 224, gaskets 232, 234, and 236, and separators (or bipolar plates) 242 and 244. Here, $1 \leq n \leq N$.

The membrane electrode assembly 210 has a structure in which catalyst electrode layers, in which electrochemical reactions occur, are attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell 100, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. The hydrogen ions alone may be selectively transferred to the air electrode 216 through the polymer electrolyte membrane 212, and at the same time, the electrons may be transferred to the air electrode 216 through the gas diffusion layers 222 and 224 and the separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell 100 may generate electric power due to the electrochemical reaction between hydrogen, which is the fuel, and oxygen contained in the air.

In the air electrode 216, the hydrogen ions supplied through the polymer electrolyte membrane 212 and the electrons transferred through the separators 242 and 244 meet oxygen in the air supplied to the air electrode 216, thus causing a reaction that generates water (hereinafter referred to as "condensate water" or "product water"). The condensate water generated in the air electrode 216 may penetrate the polymer electrolyte membrane 212 and may be transferred to the fuel electrode 214.

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reactant gases, and to transfer the generated electrical energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242, and may be electrically conductive.

The second gas diffusion layer 224 may serve to diffuse and uniformly distribute air supplied as a reactant gas through the second separator 244, and may be electrically conductive.

Each of the first and second gas diffusion layers 222 and 224 may be a microporous layer in which fine carbon fibers are combined. However, the embodiments are not limited to any specific forms of the first and second gas diffusion layers 222 and 224.

The gaskets 232, 234, and 236 serve to maintain the airtightness and clamping pressure of the cell stack at an appropriate level with respect to the reactant gases and the coolant, to disperse the stress when the separators 242 and 244 are stacked, and to independently seal the flow paths. As such, since airtightness and watertightness are maintained by the gaskets 232, 234, and 236, the flatness of the surfaces that are adjacent to the cell stack 122, which generates electric power, may be secured, and thus surface pressure may be distributed uniformly over the reaction surfaces of the cell stack 122.

The separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to the current collector 340.

The separators 242 and 244 may be respectively disposed outside the gas diffusion layers 222 and 224. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. To this end, the first separator 242 may include an anode plate (AP), in which a channel (i.e., a passage or a flow path) is formed so that hydrogen is capable of flowing therethrough.

The second separator 244 serves to supply air as a reactant gas to the air electrode 216 through the second gas diffusion layer 224. To this end, the second separator 244 may include a cathode plate (CP), in which a channel is formed so that air containing oxygen is capable of flowing therethrough. In addition, each of the first and second separators 242 and 244 may form a channel through which a cooling medium is capable of flowing.

Further, the separators 242 and 244 may be made of a graphite-based material, a composite graphite-based material, or a metal-based material. However, the embodiments are not limited to any specific material of the separators 242 and 244.

For example, each of the first and second separators 242 and 244 may include the first, second and third inflow communication portions IN1, IN2, and IN3 and the first, second and third outflow communication portions OUT1, OUT2, and OUT3.

In other words, the reactant gases required for the membrane electrode assembly 210 may be introduced into the cell through the first and second inflow communication portions IN1 and IN2, and gas or liquid, in which the reactant gases humidified and supplied to the cell and the condensate water generated in the cell are combined, may be discharged to the outside of the fuel cell 100 through the first and second outflow communication portions OUT1 and OUT2.

Each of the first and second end plates 110A and 110B may be configured such that a metal insert is surrounded by a resin material. Here, the resin material may be a synthetic resin-rubber-based material or plastic, but the embodiments are not limited to any specific kind of resin material. The metal portion of each of the first and second end plates 110A and 110B may have high rigidity to withstand internal surface pressure, and may be formed by machining a metal material. For example, the first and second end plates 110A and 110B may be formed by combining a plurality of plates, but the embodiments are not limited to any specific configuration of the first and second end plates 110A and 110B.

In addition, the fuel cell 100 may further include a heater assembly. The heater assembly serves to raise the temperature of the cell stack 122 when starting the cell stack 122 in a cooled state. To this end, the heater assembly may include at least one of a first heater assembly 300A or a second heater assembly 300B.

For example, as shown in FIG. 2, the heater assembly may include both the first heater assembly 300A and the second heater assembly 300B. At least a portion of the first heater assembly 300A may be disposed between the cell 122-1, which is located at one of the two end portions of the cell stack 122, and an inner surface 110AI of the first end plate 110A, and at least a portion of the second heater assembly 300B may be disposed between the cell 122-N, which is located at the other one of the two end portions of the cell stack 122, and an inner surface 110BI of the second end plate 110B.

According to one embodiment, as shown in FIG. 2, each of the first and second heater assemblies 300A and 300B may include a current collector 340, a heating element (a heater or a planar heating element) 330, a pad (an insulation pad or a silicon pad) 320, a heater plate (or a bypass plate) 310, and a second connector 350.

In this case, the first end plate 110A and a heater plate 310 included in the first heater assembly 300A (hereinafter referred to as a "first heater plate") may be provided separately from each other, and the second end plate 110B and a heater plate 310 included in the second heater assembly 300B (hereinafter referred to as a "second heater plate") may be provided separately from each other. Alternatively, the first end plate 110A and the first heater plate 310 may be integrated with each other, and the second end plate 110B and the second heater plate 310 may be integrated with each other.

According to another embodiment, unlike what is shown in FIG. 2, each of the first and second heater assemblies 300A and 300B may include a current collector 340, a heating element 330, a pad (an insulation pad or a silicon pad) 320, and a second connector 350. That is, neither the first heater assembly 300A nor the second heater assembly 300B may include the heater plate 310. In this case, the first end plate 110A serves as the first heater plate 310, and the second end plate 110B serves as the second heater plate 310, so the heater plate 310 may be omitted from each of the first and second heater assemblies 300A and 300B. With this exception, since the first and second heater assemblies 300A and 300B according to the other embodiment are the same as the first and second heater assemblies 300A and 300B according to the above embodiment, a duplicate description thereof will be omitted.

Hereinafter, the first and second heater assemblies 300A and 300B will be described with reference to FIG. 2. The following description of the first and second heater assemblies 300A and 300B shown in FIG. 2 may also apply to the case in which each of the end plates 110A and 110B serves as the heater plate 310.

The current collector 340 may be disposed between each of the first and second end plates 110A and 110B, which face the cell stack 122, and the cell stack 122.

That is, the current collector 340 included in the first heater assembly 300A may be disposed between the heating element 330 and one (e.g., 122-1) of the two end portions of the cell stack 122. The current collector 340 included in the second heater assembly 300B may be disposed between the heating element 330 and the other (e.g., 122-N) of the two end portions of the cell stack 122.

The current collector 340 serves to collect electrical energy generated by the flow of electrons in the cell stack 122 and to supply the same to a load of a fuel cell vehicle in which the fuel cell 100 is used. For example, the current collector 340 may be implemented as a metal plate, which is made of an electrically conductive material, and may be electrically connected to the cell stack 122.

The heating element 330 may be disposed between at least one of the two end portions of the cell stack 122 and the end plates 110A and 110B. For example, referring to FIG. 2, the heating element 330 of the first heater assembly 300A may be disposed between one (e.g., 122-1) of the two end portions of the cell stack 122 and the first end plate 110A, and the heating element 330 of the second heater assembly 300B may be disposed between the other (e.g., 122-N) of the two end portions of the cell stack 122 and the second end plate 110B. In more detail, referring to FIG. 2, the heating element 330 of the first heater assembly 300A may be disposed between the current collector 340 of the first heater assembly 300A and the first end plate 110A, and the heating element 330 of the second heater assembly 300B may be disposed between the current collector 340 of the second heater assembly 300B and the second end plate 110B.

For example, the heating element 330 may include a heating part 332, which is composed of a carbon paste and an electrode, and a protective film part, which is configured such that a polyethylene terephthalate (PET) layer disposed on both surfaces of the heating part 332, an aluminum layer disposed on both surfaces of the PET layer, and a PET layer disposed on both surfaces of the aluminum layer are sequentially stacked.

Further, in the heating element 330, the pattern of the heating part 332, which is composed of the carbon paste and the electrode, may be variously formed, and the heat density may be adjusted for each part by changing the pattern of the heating part 332. Furthermore, the heating element 330 may be implemented as a planar heating element, for example, a polymer positive temperature coefficient (PTC) heating element. If moisture permeates the carbon paste having a PTC function for a long time, heat generation performance is deteriorated. In order to prevent permeation of moisture, a PET film is attached to the carbon paste and the electrode, thereby improving resistance to moisture.

In particular, the heating element 330 may be further provided with an aluminum thin film and a PET film, which have high resistance to moisture. In this case, in order to prevent the withstand voltage performance from being deteriorated by aluminum, which is conductive, the aluminum thin film may be manufactured to have a smaller size than the PET film, thereby improving not only moisture resistance characteristics but also withstand voltage characteristics.

Further, although not shown in the drawings, thermal grease or a thermal pad may be interposed between the heating element 330 and the current collector 340 so as to be in close contact therewith. Due to the thermal pad or the thermal grease interposed between the heating element 330 and the current collector 340 in order to improve the heat conduction function, the heat generated by the heating element 330 may be efficiently transferred to the reaction cells 122-*n* of the cell stack 122 via the current collector 340.

The pad 320 blocks the heat generated by the heating element 330 from traveling in the direction in which the cell stack 122 faces the end plates 110A and 110B, and causes a larger amount of heat to travel to the cell stack 122. In this way, the pad 320 may exhibit a thermal insulation function of preventing heat loss. In addition, the pad 320 may also serve to buffer the clamping pressure of the cell stack 122. To this end, the pad 320 may be disposed between the end plates 110A and 110B and the heating element 330. For example, the pad 320 may be implemented as a foamed silicon sheet, and may prevent damage to the film-type heating element 330 when assembled with the heater plate 310 and the heating element 330 so as to be stacked in close contact therewith. However, the embodiments are not limited to any specific material of the pad 320. Alternatively, the pad 320 may be omitted from the fuel cell 100 according to the embodiment.

In addition, the pad 320 may be disposed on the surface facing the plate 110A, 110B, or the heater plate 310, among the two surfaces of the heating element 330.

The heater plate 310 is conceptually a dummy cell, which is a unit cell disposed at the outermost position in the direction in which the unit cells 122-n are stacked in the cell stack 122. The heater plate 310 may be formed in a plate shape corresponding to the external shape of the unit cells 122-n.

In addition, the heater plate 310 may have communication portions penetrating both side surfaces thereof in the first direction, for example, the first and second inflow communication portions IN1 and IN2 and the first and second outflow communication portions OUT1 and OUT2.

In addition, the heater plate 310 may be implemented as a single plate, as shown in the drawings.

Alternatively, unlike what is shown in the drawings, the heater plate 310 may be configured such that a plurality of unit heater plates, e.g., three unit heater plates, is stacked in the first direction. Similar to the membrane electrode assembly 210 in which the fuel electrode 214, the polymer electrolyte membrane 212, and the air electrode 216 are assembled into an integral form, the three unit heater plates constituting the heater plate 310 may be stacked in the first direction.

The heater plate 310 may be disposed between at least one of the two end portions 122-1 and 122-N of the cell stack 122 and the end plates 110A and 110B. For example, as shown in FIG. 2, the first heater plate 310 may be disposed between the first end plate 110A and one (e.g., 122-1) of the two end portions of the cell stack 122, and the second heater plate 310 may be disposed between the second end plate 110B and the other (e.g., 122-N) of the two end portions of the cell stack 122. In detail, the first heater plate 310 may be disposed between the first end plate 110A and the pad 320 of the first heater assembly 300A, and the second heater plate 310 may be disposed between the second end plate 110B and the pad 320 of the second heater assembly 300B.

In addition, the heater plate 310 may be configured such that a metallic pipe is integrally formed with a plastic body through an insert injection molding method, and the pipe may form flow channels (e.g., a hydrogen channel and an oxygen channel). However, the embodiments are not limited to any specific material of the heater plate 310.

According to the embodiment, the heating element 330 of each of the first and second heater assembly 300A and 300B may include a first connector 334, which will be described later. In this case, each of the first and second heater assemblies 300A and 300B may further include a second connector 350. The second connector 350 may be detachably coupled to the first connector 334, and may supply power to the heating element 300 so that the heating element 330 generates heat.

In addition, the fuel cell 100 may further include a wire 360, which is connected to the second connector 350 in order to supply power to the heating element 330. The power required in order for the heating element 330 to generate heat may be supplied from the cell stack 122 to the heating element 330 via the wire 360, the second connector 350, and the first connector 334.

Hereinafter, an embodiment of each of the first and second heater assemblies 300A and 300B will be described in more detail with reference to the accompanying drawings. For convenience of description, only the second heater assembly 300B will be described. However, the following description of the second heater assembly 300B may also apply to the first heater assembly 300A.

Figure 3A:
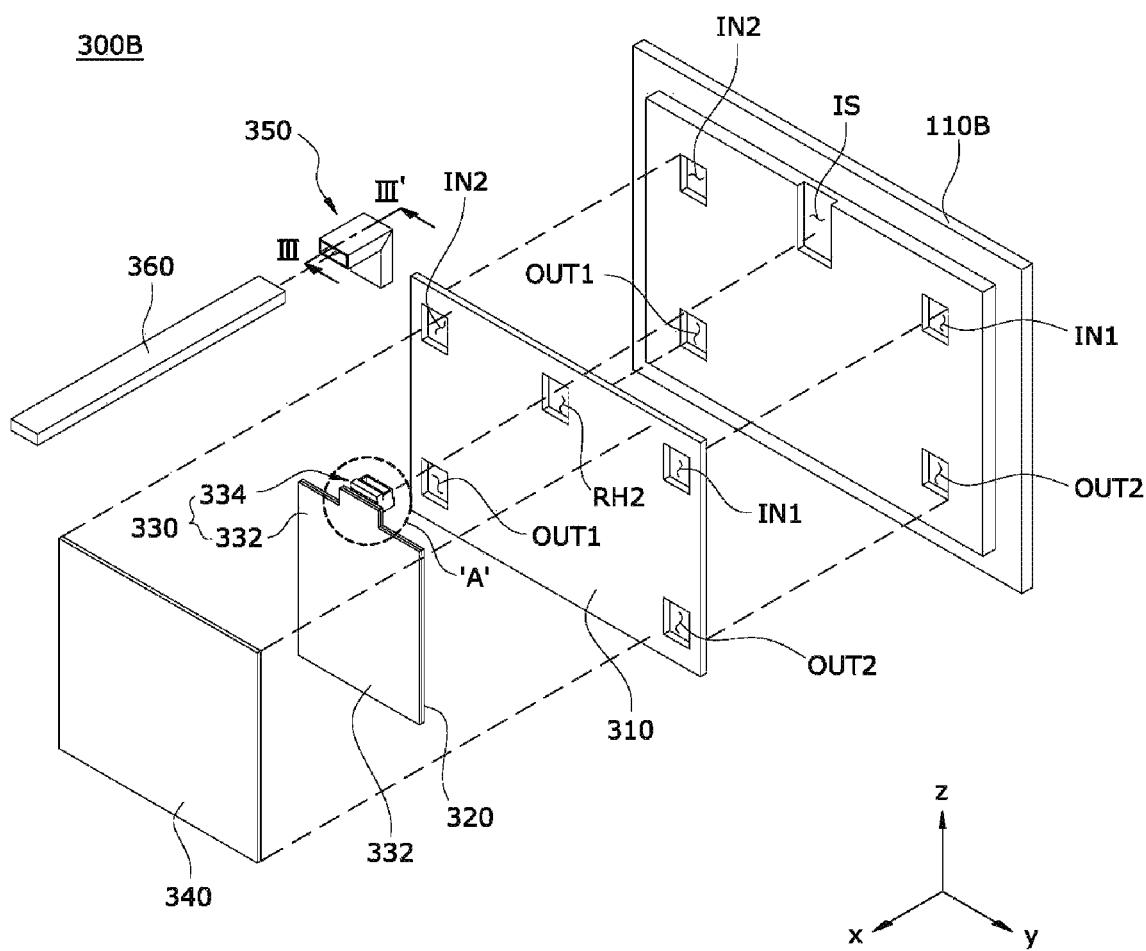
FIG. 3A is an exploded perspective view of a second heater assembly.
Figure 3B:
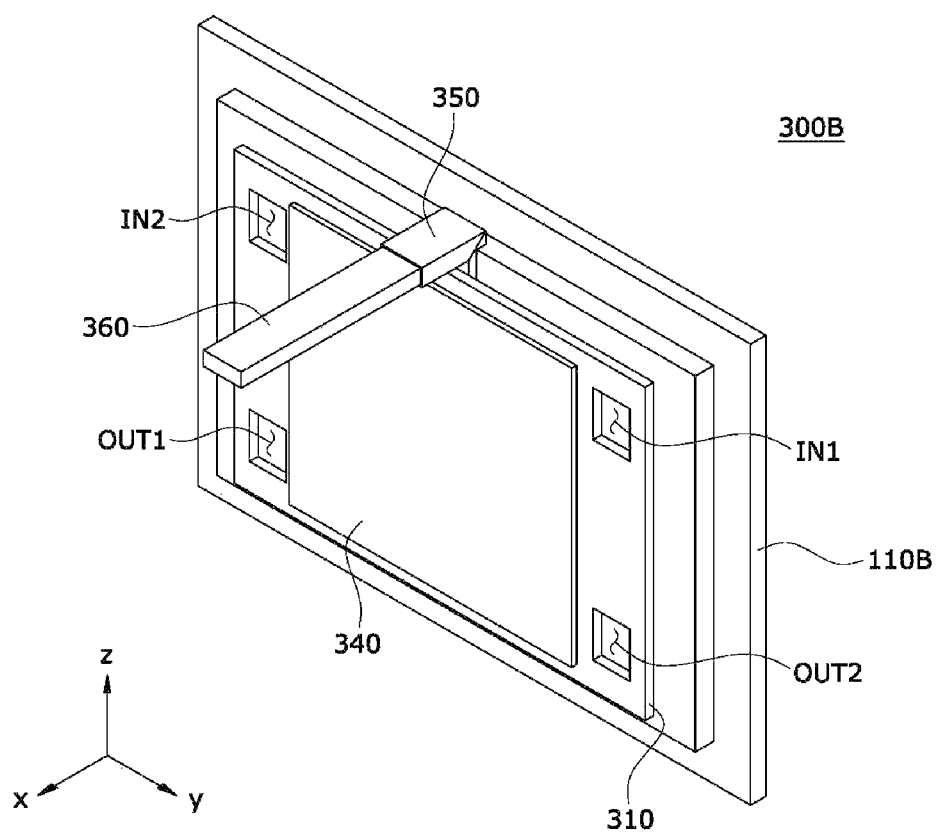
FIG. 3B is a coupled perspective view of the second heater assembly shown in FIG. 3A.

FIG. 3A is an exploded perspective view of the second heater assembly 300B, and FIG. 3B is a coupled perspective view of the second heater assembly 300B shown in FIG. 3A.

Since the second end plate 110B, the second heater plate 310, the pad 320, the heating element 330, the current collector 340, the second connector 350, and the wire 360 shown in FIGS. 3A and 3B respectively correspond to the second end plate 110B, the heater plate 310, the pad 320, the heating element 330, the current collector 340, the second connector 350, and the wire 360 shown in FIG. 2, the same parts are denoted by the same reference numerals, and duplicate descriptions thereof will be omitted.

The heating element 330 may include a heating part 332 and a first connector 334.

The heating part 332 is a part that is connected to the first connector 334 and generates heat. As shown in the drawings, the heating part 332 may have a plate shape (or a planar shape).

Figure 4A:
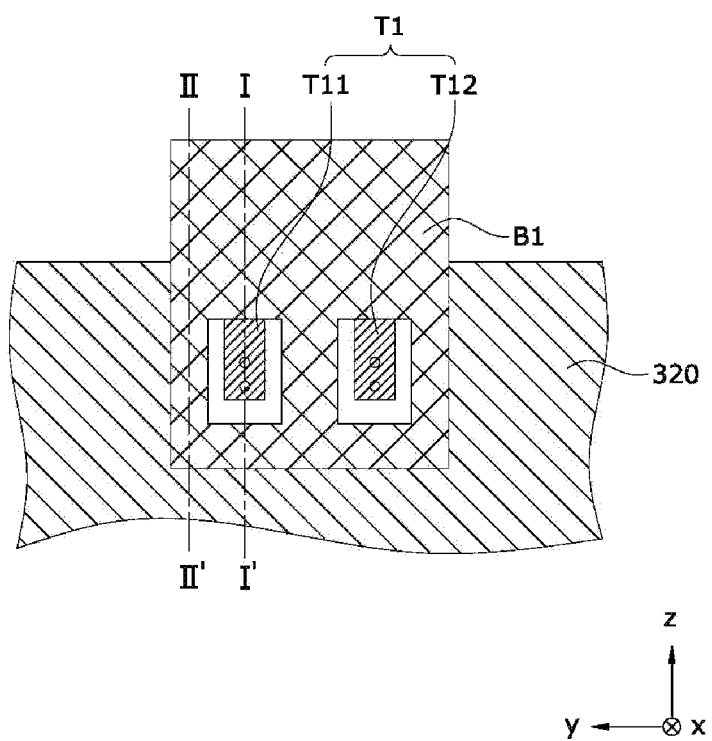
FIG. 4A is a front view of portion A shown in FIG. 3A when viewed from a second end plate.
Figure 4B:
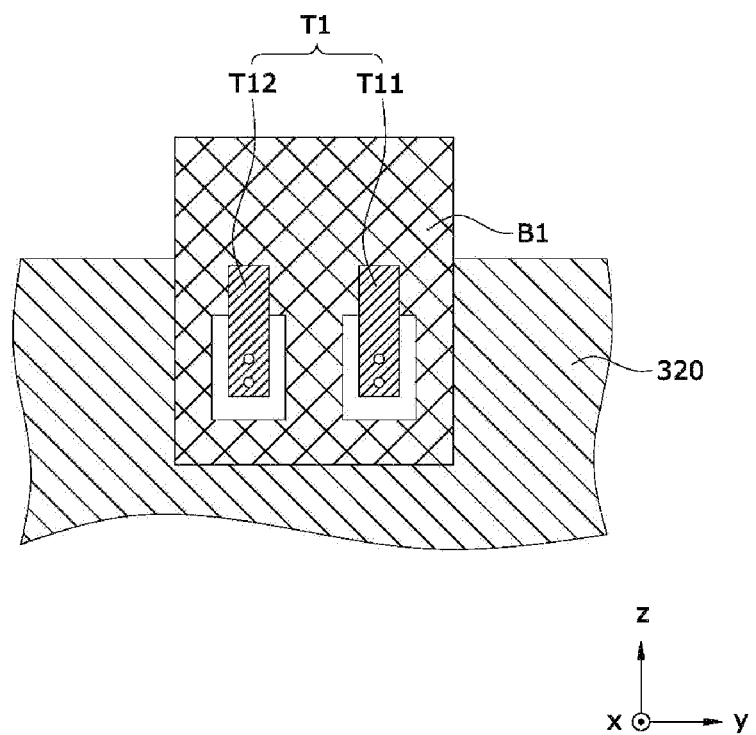
FIG. 4B is a front view of portion A shown in FIG. 3A when viewed from a current collector.

FIG. 4A is a front view of portion A shown in FIG. 3A when viewed from the second end plate 110B, and FIG. 4B is a front view of portion A shown in FIG. 3A when viewed from the current collector 340.

For better understanding of a first terminal, which will be described later, illustration of the heating part 332 is omitted from FIGS. 4A and 4B.

Figure 5:
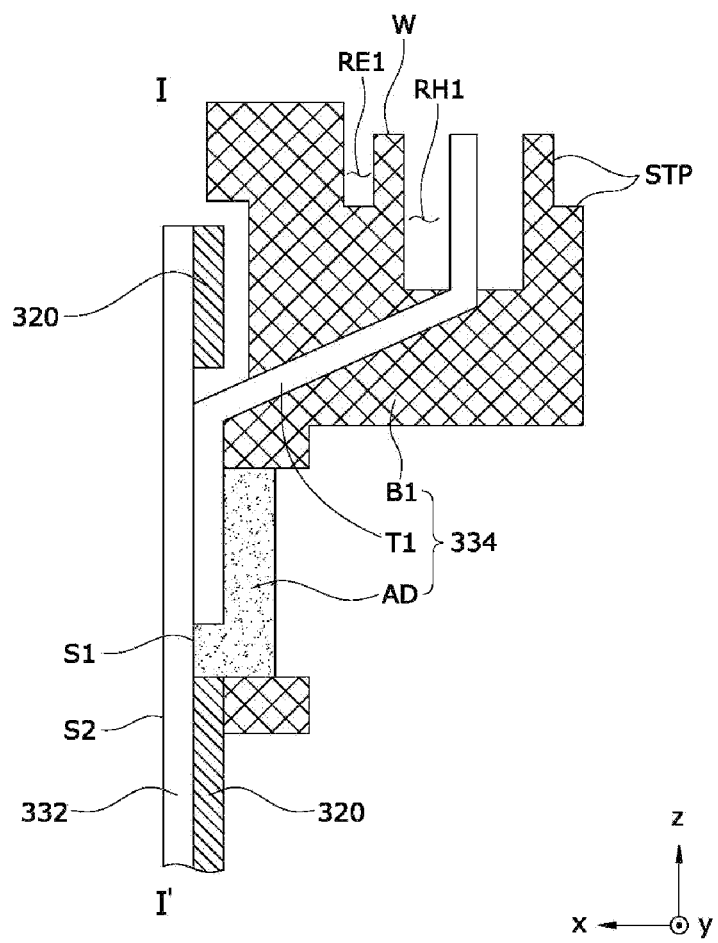
FIG. 5 is a cross-sectional view taken along line I-I' shown in FIG. 4A.
Figure 6:
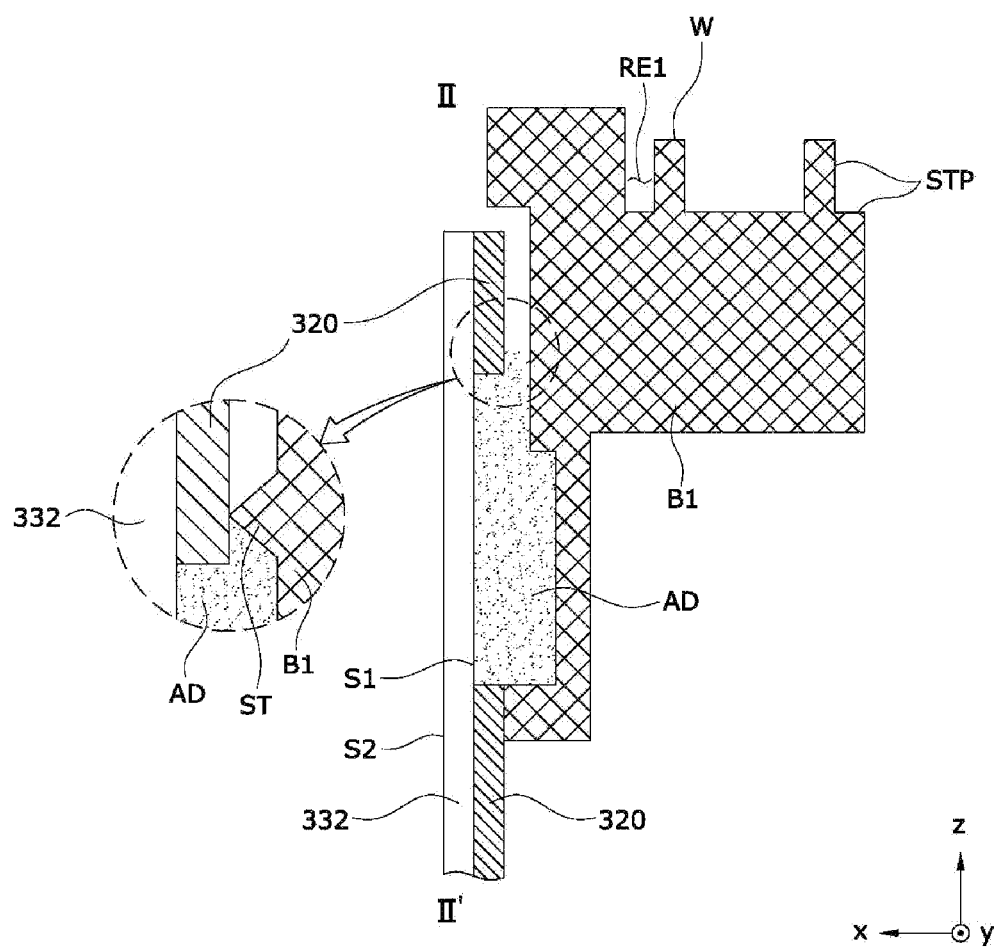
FIG. 6 is a cross-sectional view taken along line II-II' shown in FIG. 4A.
Figure 7:
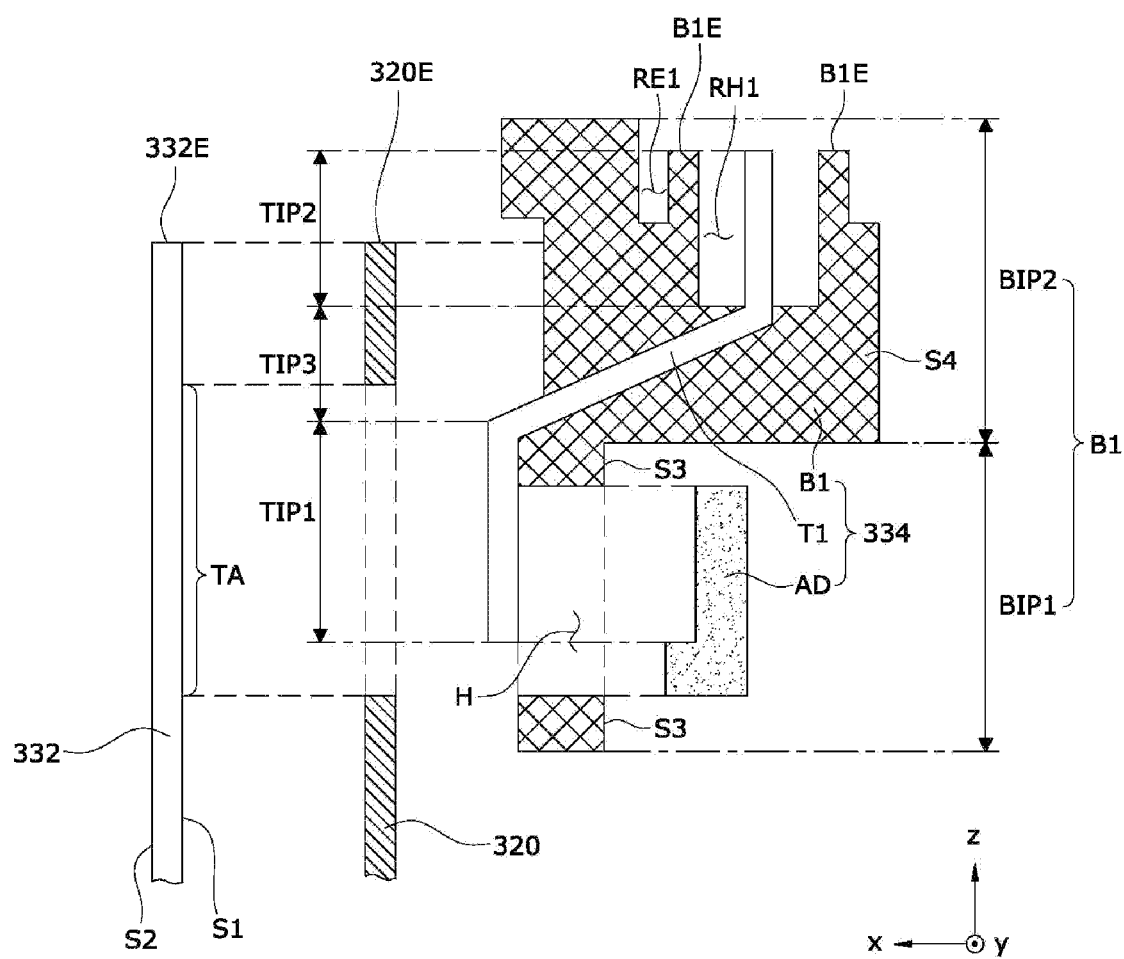
FIG. 7 is an exploded view of the cross-sectional view shown in FIG. 5.

FIG. 5 is a cross-sectional view taken along line I-I' shown in FIG. 4A, FIG. 6 is a cross-sectional view taken along line II-II' shown in FIG. 4A, and FIG. 7 is an exploded view of the cross-sectional view shown in FIG. 5.

The heating part 332 may include a first surface S1, which faces the plate 110B or 310, and a second surface S2, which is formed opposite the first surface Si in the first direction.

The first connector 334 may be mounted to an edge 332E of the heating part 332. As shown in the drawings, when the pad 320 is disposed on the first surface S1 of the heating part 332, the first connector 334 may be mounted to the edge 332E of the heating part 332 and an edge 320E of the pad 320.

The first connector 334 may include a first terminal T1, a first body B1, and an adhesive member AD.

A portion of the first terminal T1 may protrude in the second direction intersecting the first direction. The first terminal T1 may include a pair of heater terminals (hereinafter referred to as "first heater terminals") T11 and T12.

In this case, referring to FIGS. 5 and 7, at least a portion of the first terminal T1 may protrude further than the edge 332E of the heating part 332 in the second direction. The first terminal T1 may include an end T1P1, an opposite end T1P2, and a first terminal body T1P3.

The end T1P1 of the first terminal T1 may be in contact with a terminal area TA. The terminal area TA is a portion of the first surface S1 of the heating part 332 that is exposed, rather than being covered by the pad 320. The terminal area TA is located at a peripheral portion of the first surface S1 (i.e., a portion adjacent to the edge 332E of the heating part 332). The terminal area TA is illustrated in detail in FIGS. 14A and 14B, which will be described later.

The opposite end T1P2 of the first terminal T1 is received in a first receiving recess RH1 in the first body B1, which will be described later.

The opposite end T1P2 of the first terminal T1 is located farther away from the first surface S1 of the heating part 332 than the end T1P1 in the first direction, and is connected to a second terminal T2 of the second connector 350.

The first terminal body T1P3 of the first terminal T1 may interconnect the end T1P1 and the opposite end T1P2, and may be disposed in the first body B1. As will be described later, at least a portion of the first terminal body T1P3 may be embedded in the first body B1, or the first terminal body T1P3 may be disposed in an empty space in the first body B1.

The body B1 may include a first portion B1P1 and a second portion B1P2.

Referring to FIG. 7, the first portion B1P1 may have a recess H formed therein to expose at least a portion of the terminal area TA in the first direction.

The second portion B1P2 may have a first receiving recess RH1 formed therein, and may be formed adjacent to the first portion B1P1 in the second direction. As shown in the drawings, the opposite end T1P2 of the first terminal T1, which protrudes in the second direction, may be received in the first receiving recess RH1.

The adhesive member AD is embedded in the recess H, and serves to fix the first body B1 to the heating part 332. In addition, the adhesive member AD inserted into the recess H may fix the end T1P1 of the first terminal T1, which is exposed to the recess H, to the terminal area TA of the first surface S1 of the heating part 332. The adhesive member AD may be made of, for example, silicon.

According to the embodiment, each of the first portion B1P1 and the second portion B1P2 of the first body B1 may be disposed so as to be in contact with the insulation pad 320, thereby trapping the adhesive member AD in the recess H. For example, referring to FIG. 6, the second portion B1P2 of the first body B1 may include a stopper ST. The stopper ST protrudes from the surface of the second portion B1P2 that faces the pad 320 toward the pad 320, and serves to prevent the adhesive member AD from leaking outside the recess H.

Meanwhile, referring again to FIGS. 3A and 3B, the second connector 350 may include a second terminal T2, which is joined (or coupled or connected) to the first connector 334 in the second direction from the outside of the plate 110B or 310 and is thus electrically connected to the first terminal T1.

As described above, since the second connector 350 is detachably coupled to the first connector 334, the second connector 350 may be separated from the first connector 334 after being coupled to the first connector 334.

Figure 8:
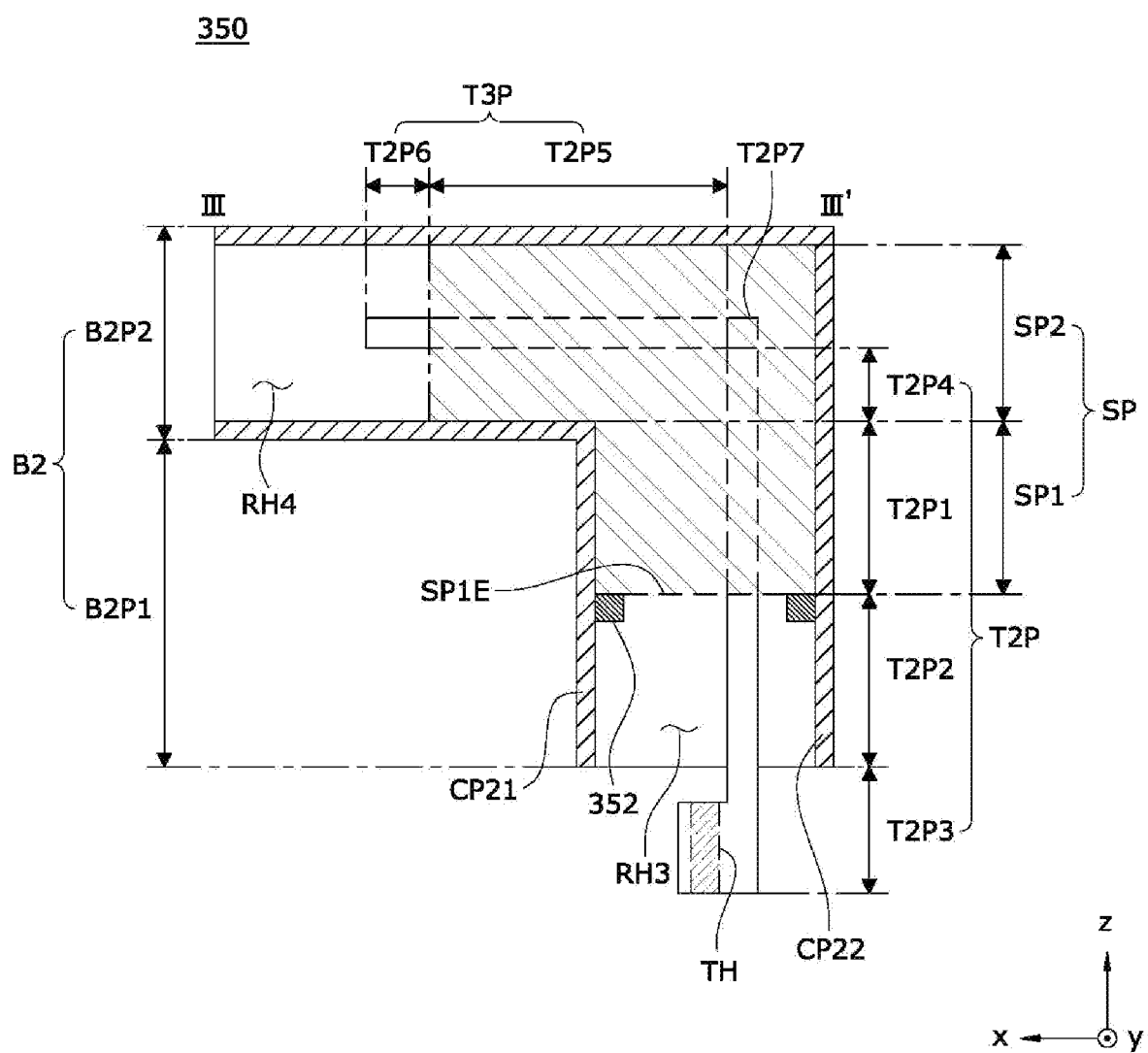
FIG. 8 is a cross-sectional view of the second connector shown in FIG. 3A taken along line III-III'.

FIG. 8 is a cross-sectional view of the second connector 350 shown in FIG. 3A taken along line III-III'.

Figure 9:
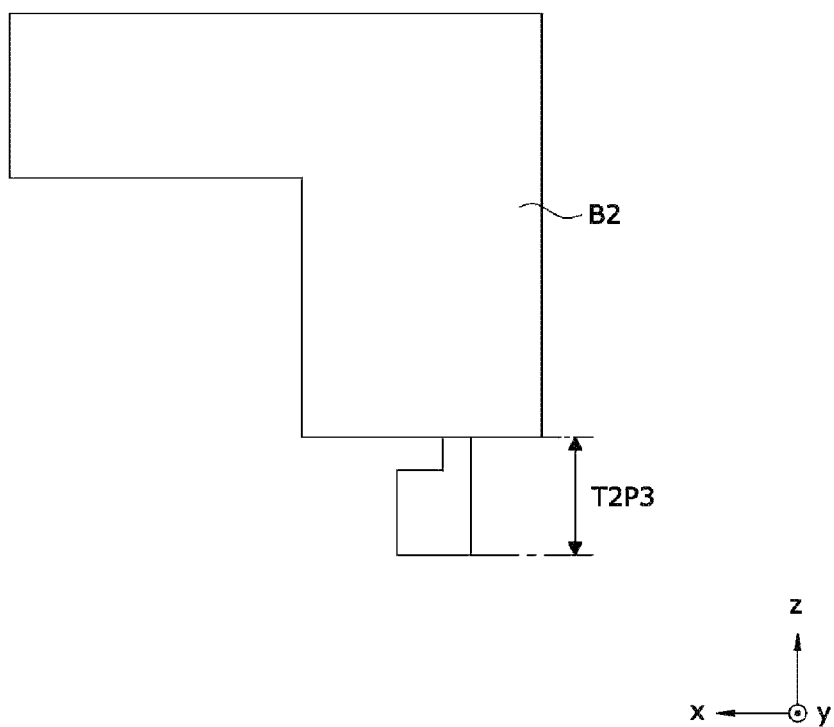
FIG. 9 is a side view of the second connector shown in FIG. 8.
Figure 10:
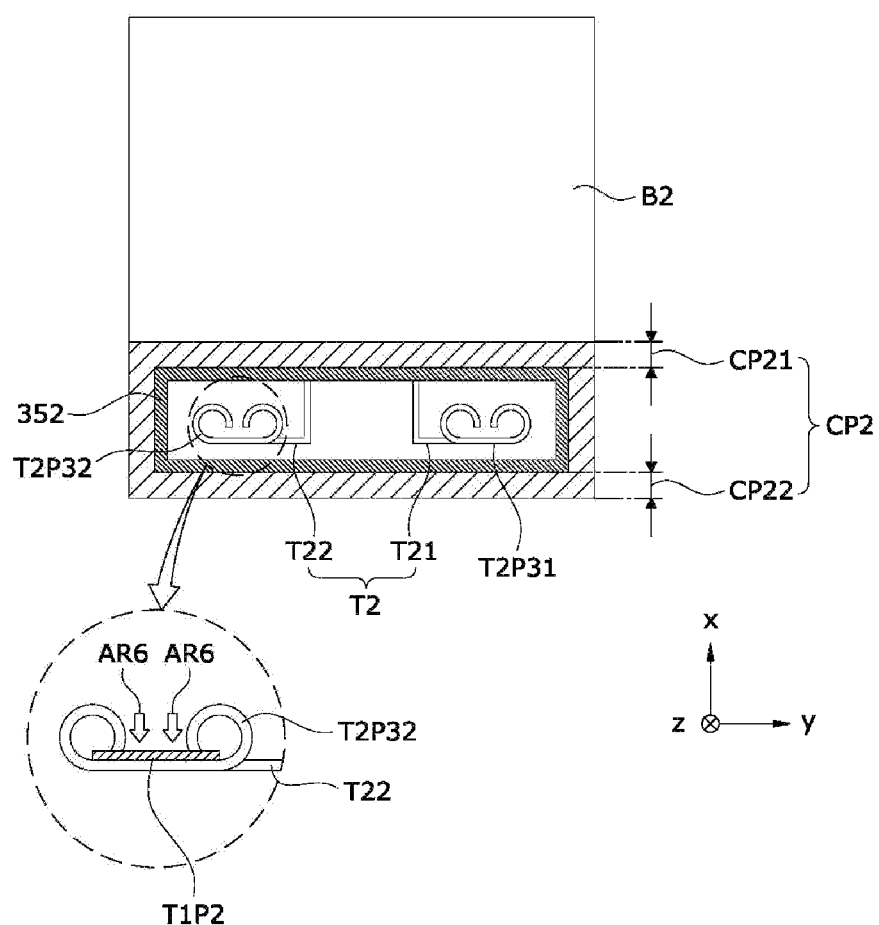
FIG. 10 is a view of the second connector shown in FIG. 9 when viewed from a first connector.

FIG. 9 is a side view of the second connector 350 shown in FIG. 8, and FIG. 10 is a view of the second connector 350 shown in FIG. 9 when viewed from the first connector 334.

The second connector 350 may include a second body B2 and the second terminal T2.

The second body B2 may include a third portion B2P1 and a fourth portion B2P2.

The third portion B2P1 may include a portion SP1 of a support portion SP and a third receiving recess RH3.

The third receiving recess RH3 may be formed in an end portion extending from the portion SP1 of the support portion SP in the second direction.

The fourth portion B2P2 may include a remaining portion SP2 of the support portion SP and a fourth receiving recess RH4.

The fourth receiving recess RH4 may be formed in an end portion of the remaining portion SP2 of the support portion SP, which is bent and extends in the first direction from the portion SP1 of the support portion SP, which is located in the third portion B2P1.

The second terminal T2 may include a pair of heater terminals (hereinafter referred to as "second heater terminals") T21 and T22. Each of the second heater terminals T21 and T22 may include a second terminal body T2P and a third terminal body T3P.

The second terminal body T2P may include a first embedded portion T2P1, a first protruding portion T2P2, and a connection portion T2P3. In addition, the second terminal body T2P may further include an extension portion T2P4.

The first embedded portion T2P1 may be a portion of the second terminal body T2P that is embedded in the portion SP1 of the support portion SP. The first protruding portion T2P2 may be a portion that protrudes from the first embedded portion T2P1 in the second direction and is received in the third receiving recess RH3. The connection portion T2P3 may be a portion that extends from the first protruding portion T2P2 in the second direction and is connected to the opposite end T1P2 of the first terminal T1. According to the embodiment, the connection portion T2P3 may have formed therein a through-hole TH through which the opposite end T1P2 of the first terminal T1 passes. In this case, the entire area of the opposite end T1P2 of the first terminal T1 is in contact with the through-hole TH in the connection portion T2P3, and accordingly, electrical contact between the first terminal T1 and the second terminal T2 may be improved.

In addition, the extension portion T2P4 may be a portion that extends from the first embedded portion T2P1 toward the fourth portion B2P2 in the second direction.

The third terminal body T3P may include a second embedded portion T2P5 and a second protruding portion T2P6.

The second embedded portion T2P5 may be a portion that is bent and extends in the first direction from the second terminal body T2P and is embedded in the remaining portion SP2 of the support portion SP. The second protruding portion T2P6 may be a portion that protrudes from the second embedded portion T2P5 in the first direction and is received in the fourth receiving recess RH4.

In this case, a portion T2P7 that is disposed between the second embedded portion T2P5 and the extension portion T2P4 may belong to any one of the second terminal body T2P and the third terminal body T3P.

One of the first and second terminals T1 and T2 may include a pair of male heater terminals protruding in the second direction, and the other one of the first and second terminals T1 and T2 may include a pair of female heater terminals into which the pair of male heater terminals is inserted.

In the above-described embodiment, the pair of first heater terminals T11 and T12 is illustrated as being male heater terminals, and the pair of second heater terminals T21 and T22 is illustrated as being female heater terminals.

However, the embodiments are not limited thereto. That is, according to another embodiment, the pair of first heater terminals T11 and T12 may be female heater terminals, and the pair of second heater terminals T21 and T22 may be male heater terminals.

In this case, referring to FIG. 10, the connection portion T2P3 may include first and second connection portions T2P31 and T2P32.

The first connection portion T2P31 corresponds to the connection portion T2P3 of one T21 of the second heater terminals T21 and T22, and has the shape of a female heater terminal that is coupled to one T11 of the first heater terminals T11 and T12. The second connection portion T2P32 corresponds to the connection portion T2P3 of the other T22 of the second heater terminals T21 and T22, and has the shape of a female heater terminal that is coupled to the other T12 of the first heater terminals T11 and T12.

Each of the first and second connection portions T2P31 and T2P32 may be coupled to the opposite end T1P2 of the first terminal T1 in any of various forms that are capable of maintaining the coupled state. For example, as shown in FIG. 10, the second connection portion T2P32 may be formed to have a spring-shaped cross-section. When the opposite end T1P2 of the first terminal T1 is inserted into the second connection portion T2P32 in the second direction, the opposite end T1P2 of the first terminal T1 is pressed in the first direction indicated by the arrow AR6 by the elasticity of the spring, with the result that these components T2P32 and T1P2 are securely coupled to each other and are thus prevented from being unintentionally separated from each other.

Hereinafter, the coupling of the first connector 334 and the second connector 350 shown in FIGS. 3A and 3B will be described with reference to the accompanying drawings.

Figure 11A:
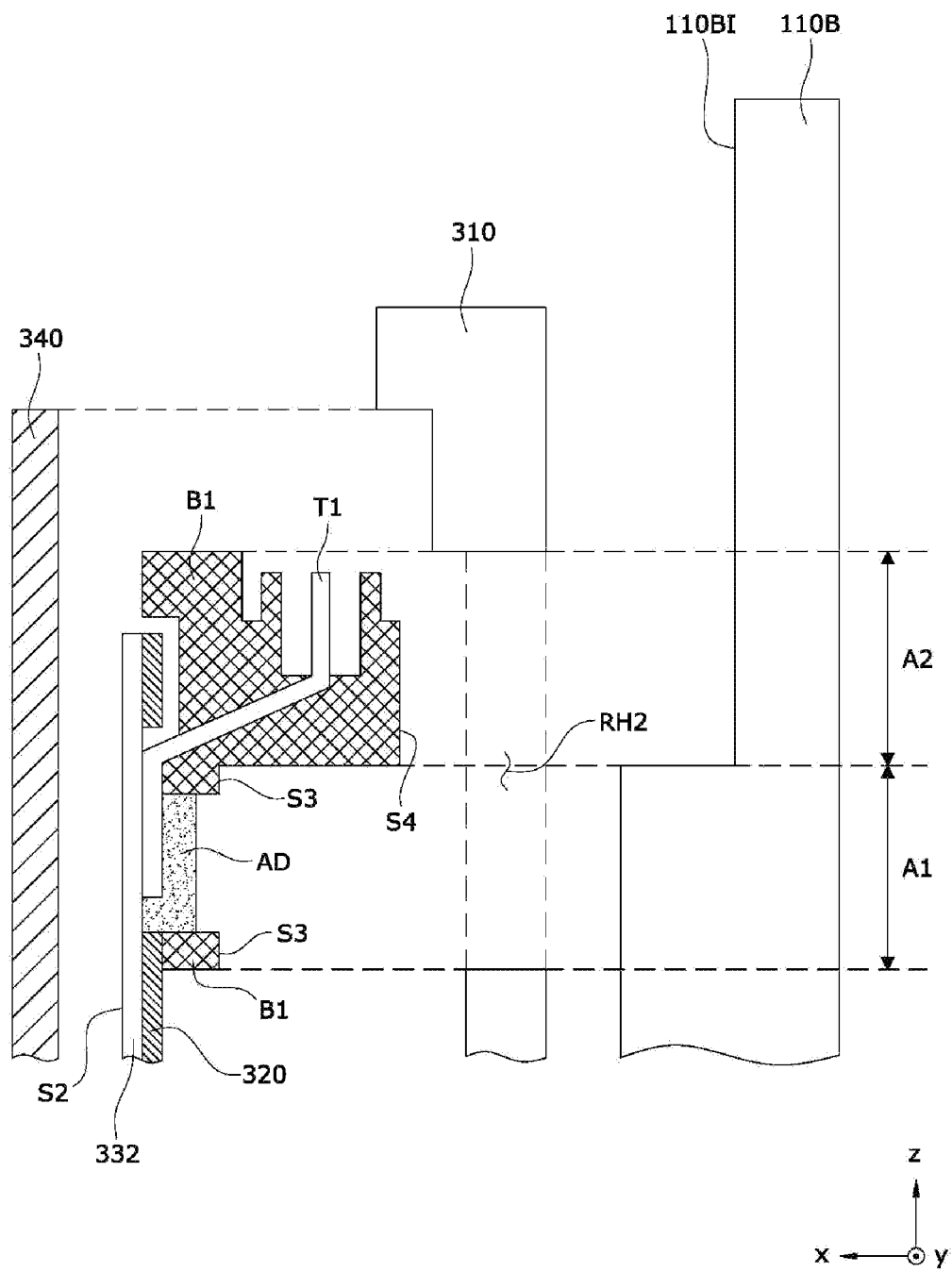
FIGS. 11A, 11B and 11C are cross-sectional views for explaining the process of coupling the first connector and the second connector to each other.
Figure 11B:
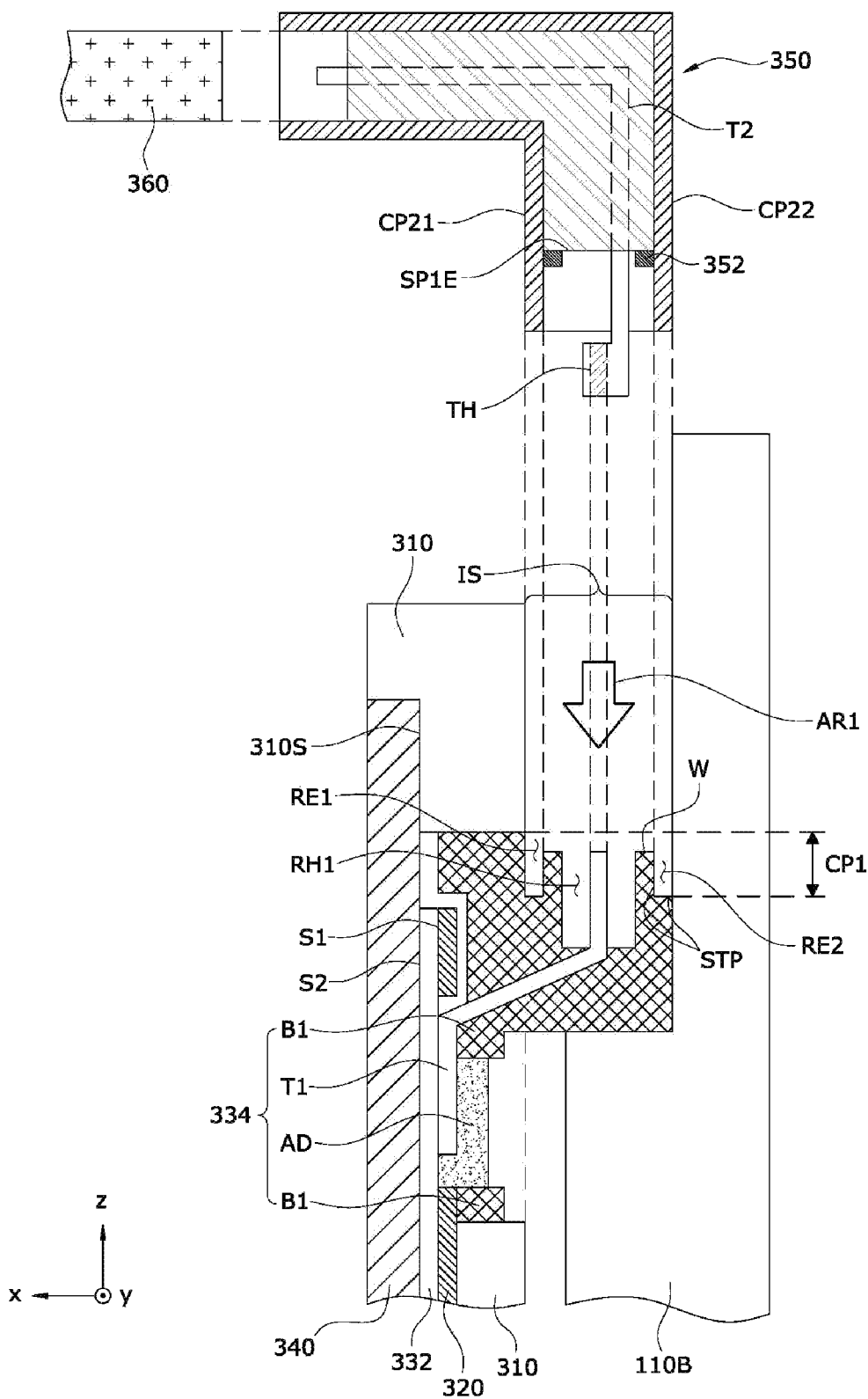
Figure 11C:
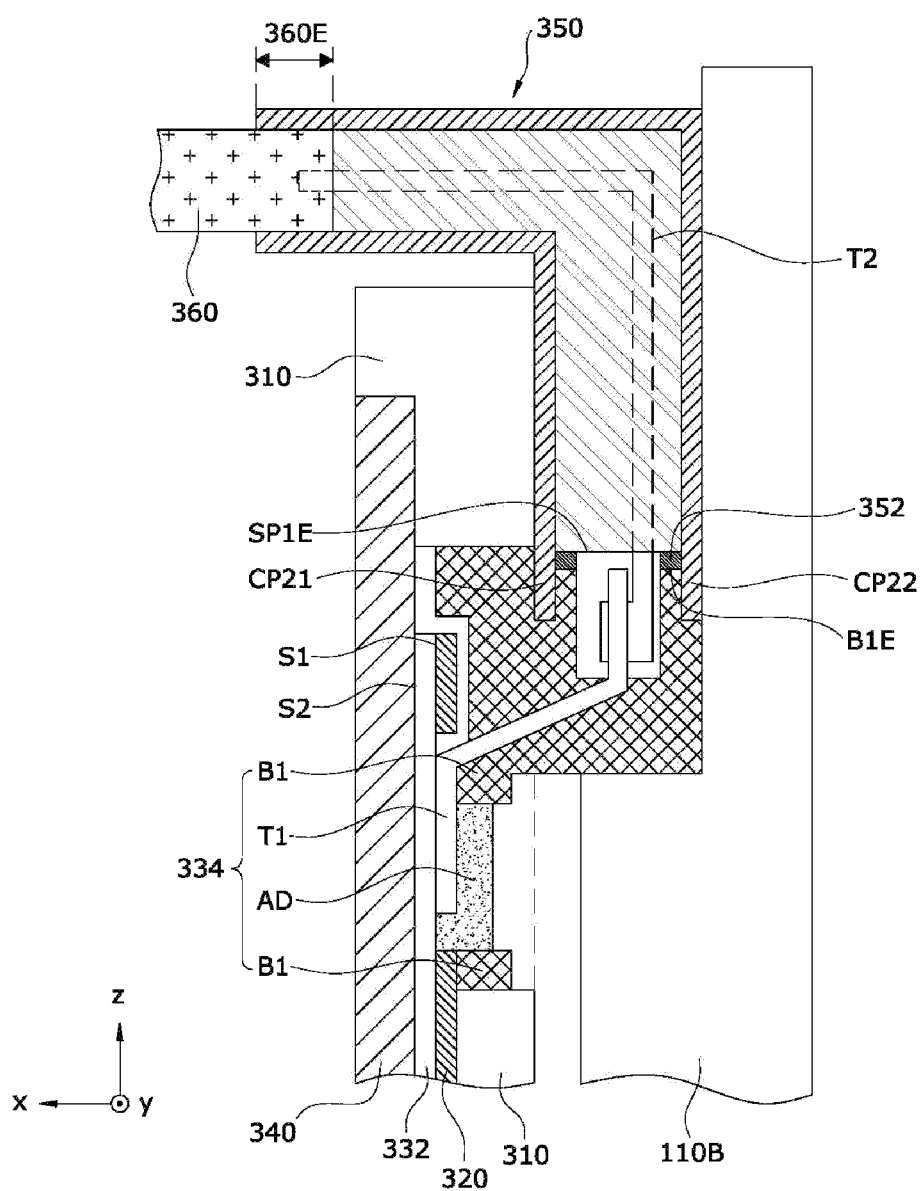

FIGS. 11A to 11C are cross-sectional views for explaining the process of coupling the first connector 334 and the second connector 350 to each other. Illustration of the second connector 350 is omitted from FIG. 11A.

Figure 12A:
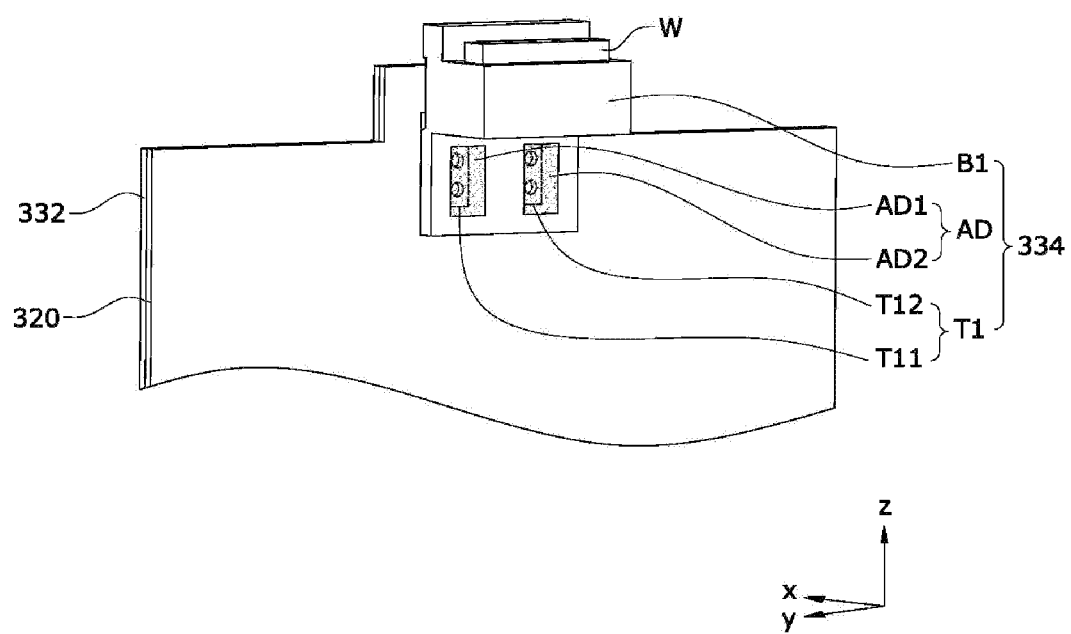
FIGS. 12A and 12B are perspective views for explaining the process of coupling the first connector and the second connector to each other.
Figure 12B:
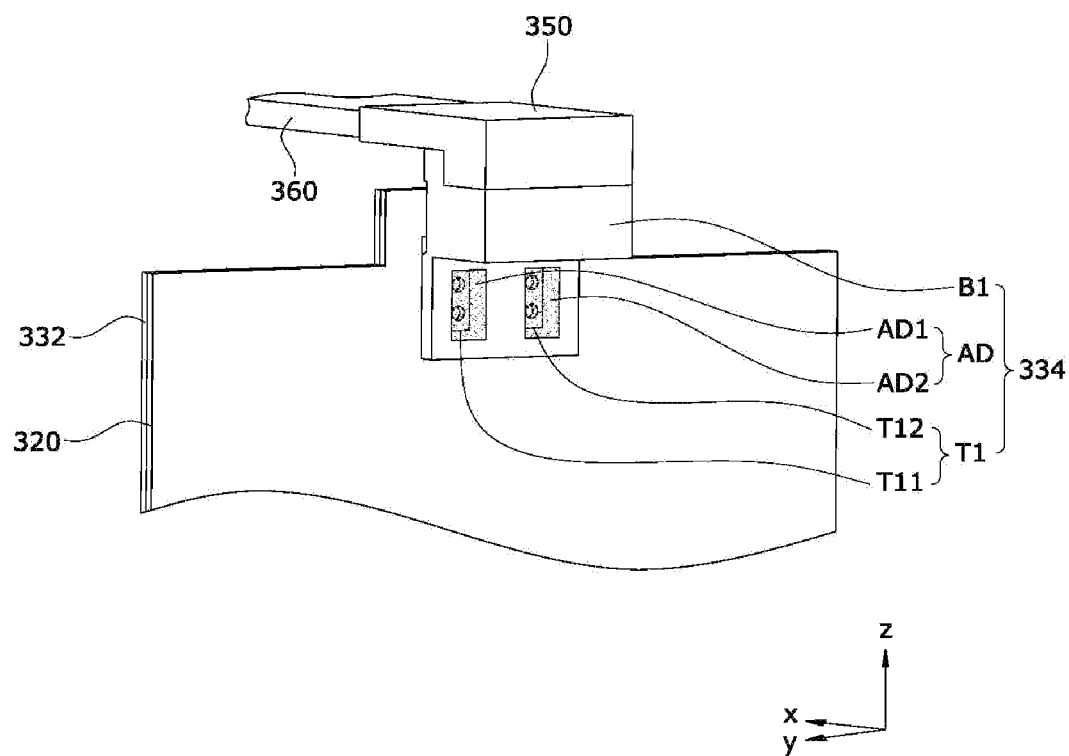

FIGS. 12A and 12B are perspective views for explaining the process of coupling the first connector 334 and the second connector 350 to each other.

Figure 13:
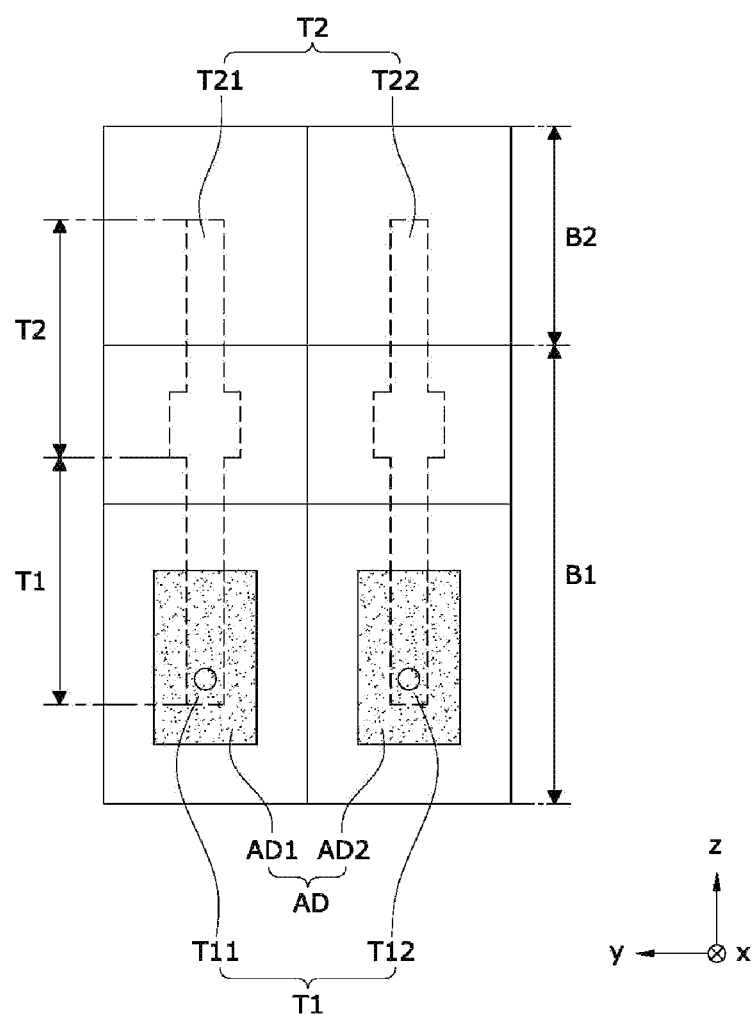
FIG. 13 illustrates the state in which the first connector and the second connector are coupled to each other.

FIG. 13 illustrates the state in which the first connector 334 and the second connector 350 are coupled to each other.

For better understanding, portions that are hidden in FIGS. 11A to 13 are indicated by dotted lines.

In FIGS. 11A to 13, the same components as those of the fuel cell 100 described above are denoted by the same reference numerals, and duplicate descriptions thereof will be omitted.

Although the plate is illustrated in FIGS. 11A to 11C as including the second end plate 110B and the second plate 310, the embodiments are not limited thereto. That is, the following description made with reference to FIGS. 11A to 11C may also apply to the case in which the second end plate 110B serves as the second heater plate 310, in which case the second heater plate 310 is omitted.

In addition, the second heater plate 310 and the second end plate 110B shown in FIGS. 11A to 11C may be provided separately from each other, or may be integrated with each other.

First, the first connector 334 shown in FIG. 11A is coupled to the second heater plate 310 in the first direction, and the current collector 340 is coupled to the second heater plate 310 in the first direction. For example, the current collector 340 may be fixed to the second heater plate 310 using an adhesive (not shown). That is, the components shown in FIG. 11A may be coupled to each other as shown in FIG. 11B.

The plate may have a second receiving recess RH2 formed therein. The second receiving recess RH2 serves to receive the first connector 334 inserted thereinto in the first direction. The second receiving recess RH2 may be formed in the second heater plate 310. After the first connector 334 is received in the second receiving recess RH2, the second surface S2 of the heating part 332 and an outer surface 310S of the second heater plate 310 may be located in the same horizontal plane. Here, the outer surface 310S of the second heater plate 310 may be a surface of the second heater plate 310 that is in contact with the current collector 340.

The plate may include an insertion portion IS in order to couple the second connector 350 to the first connector 334, which is coupled as shown in FIGS. 11B and 12A, as shown in FIGS. 11C and 12B.

The insertion portion IS is a portion that allows insertion of the second connector 350 into the first receiving recess RH1 in the first connector 334 in the second direction indicated by the arrow AR1 in the state in which the first connector 334 is received in the second receiving recess RH2. The second terminal T2 of the second connector 350, inserted into the insertion portion IS, is coupled to and electrically connected to the first terminal T1 of the first connector 334.

Referring to FIGS. 7 and 11A, the plate, i.e., the second end plate 110B, may include a first area A1 and a second area A2. The first and second areas A1 and A2 may be areas on the inner surface 110BI of the second end plate 110B.

The first area A1 may be defined as an area that overlaps the first portion B1P1 of the first body B1 in the first direction, and the second area A2 may be defined as an area that is adjacent to the first area A1 and overlaps the second portion B1P2 of the first body B1 in the first direction.

In this case, the insertion portion IS may be formed in a manner such that the second area A2 is formed so as to be stepped with respect to the first area A1. As such, when the inner surface 110BI of the second end plate 110B is formed to have a stepped portion in order to form the insertion portion IS, a third surface S3 of the first portion B1P1, which faces the first area A1, and a fourth surface S4 of the second portion B1P2, which faces the second area A2, are formed so as to be stepped with respect to each other.

When the first connector 334 and the second connector 350 are coupled to each other as shown in FIGS. 11C and 12B, one T11 of the pair of first heater terminals T11 and T12 may be connected to one T21 of the pair of second heater terminals T21 and T22, and the other T12 of the pair of first heater terminals T11 and T12 may be connected to the other T22 of the pair of second heater terminals T21 and T22, as shown in FIG. 13.

Meanwhile, as shown in FIGS. 7 and 11B, the first connector 334 may include a first coupling portion CP1, and as shown in FIGS. 8, 10, and 11B, the second connector 350 may include a second coupling portion CP2. The first coupling portion CP1 may be formed in the second portion B1P2 of the first body B1 of the first connector 334, and the second coupling portion CP2 may be formed in the third portion B2P1 of the second connector 350 so as to overlap the third receiving recess RH3 in the first direction. The second coupling portion CP2 may be coupled to the first coupling portion CP1 in the second direction in a fitting manner.

Referring to FIG. 5, the first coupling portion CP1 may include a partition wall W, a first recess RE1, and a stepped portion STP.

The partition wall W may protrude in the second direction to define the first receiving recess RH1, and may surround the opposite end T1P2 of the first terminal T1, as shown in FIG. 12A. Since the opposite end T1P2 of the first terminal T1 is surrounded by the partition wall W, the heat generated by the heating part 332 may be blocked by the partition wall W, and thus may not be transferred to the opposite end T1P2 of the first terminal T1.

The first recess RE1 may be formed near the partition wall W, and the second portion B1P2 may have a shape that forms the first recess RE1 together with the partition wall W.

The stepped portion STP may be formed near the partition wall W, and may form a second recess RE2 together with the plate (the second end plate 110B shown in FIG. 11B). That is, the second area A2 of the inner surface 110BI of the second end plate 110B and the stepped portion STP may together form the second recess RE2.

The second coupling portion CP2 may include first and second coupling members CP21 and CP22. As shown in FIG. 8, in the third portion B2P1, a portion defining the third receiving recess RH3 may correspond to the coupling members CP21 and CP22. The first coupling member CP1 may be fitted into the first recess RE1 shown in FIG. 11B, as shown in FIG. 11C, and the second coupling member CP2 may be fitted into the second recess RE2 shown in FIG. 11B, as shown in FIG. 11C.

Here, although illustrated in the cross-sectional views as being provided separately from each other, the first and second coupling members CP21 and CP22 may be integrated with each other, and the first and second recesses RE1 and RE2 may communicate with each other to form an integral recess.

In addition, the second connector 350 may further include a gasket 352. Referring to FIGS. 8, 10, and 11C, the gasket 352 may be disposed at an end SP1E of the portion SP1 of the support portion SP, which is contiguous with the third receiving recess RH3 in the third portion B2P1 of the second body B2.

Therefore, as shown in FIG. 11C, when the first connector 334 and the second connector 350 are coupled to each other, the gasket 352 may be disposed between the end SP1E and an end B1E.

Meanwhile, the wire 360 may be coupled to the second protruding portion T2P6 shown in FIG. 8 in a female-male coupling manner, as shown in FIG. 11C. To this end, an end portion 360E of the wire 360 may be coupled to the fourth receiving recess RH4 in the second connector 350 in a fitting manner.

In addition, as shown in FIG. 3A, the wire 360 may be provided separately from the second connector 350. In this case, as shown in FIG. 11C, after the second connector 350 is coupled to the first connector 334, the wire 360 may be connected to the second connector 350.

Alternatively, the wire 360 may be integrated with the second connector 350. In this case, the second connector 350 integrated with the wire 360 may be connected to the first connector 334.

As described above, when the wire 360 is connected, the power supplied from the cell stack 122 via the wire 360 may be transmitted to the heating part 332 via the second terminal T2 of the second connector 350 and the first terminal T1 of the first connector 334. Accordingly, the heating part 332 may generate heat, and may thus raise the temperature of the cell stack 122.

Hereinafter, a method of manufacturing the first connector 334 will be described with reference to the accompanying drawings.

FIGS. 14A to 14E are perspective views for explaining processes of a method of manufacturing the first connector 334 according to an embodiment.

Figure 14A:
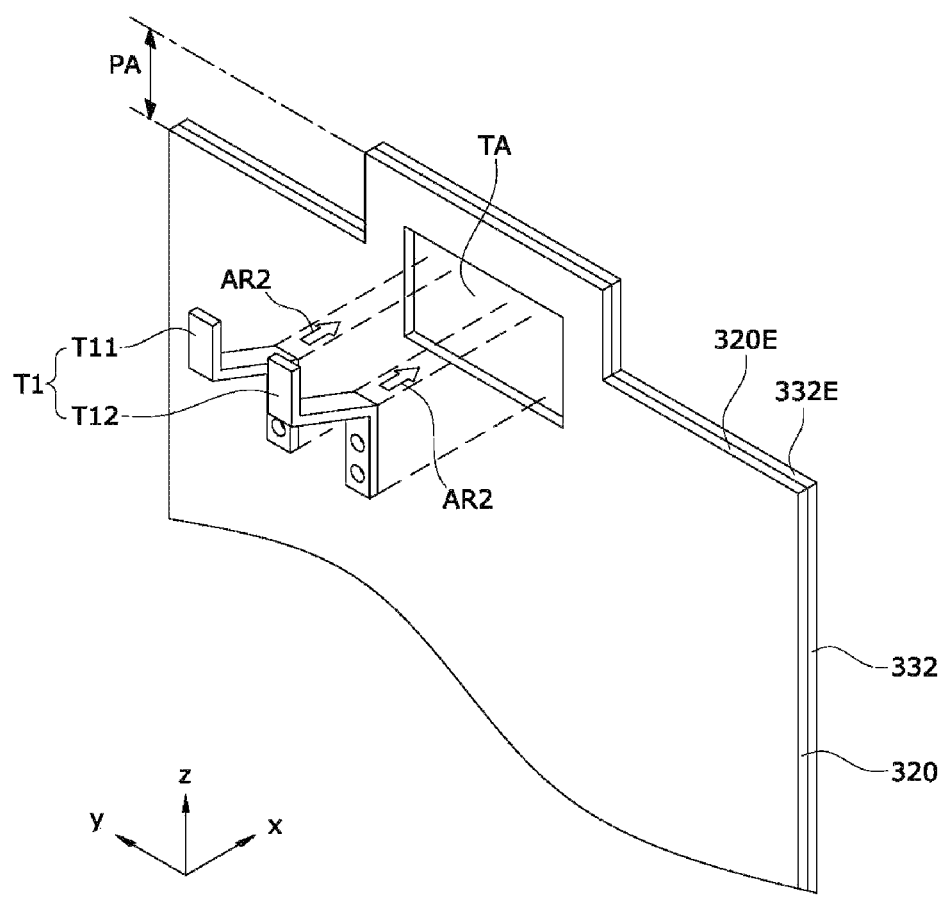
FIGS. 14A, 14B, 14C, 14D and 14E are perspective views for explaining processes of a method of manufacturing the first connector according to an exemplary embodiment of the present disclosure.

According to one embodiment, as shown in FIG. 14A, the pad 320 is disposed on the first surface S1 of the heating part 332 so as to expose the terminal area TA. In this case, at least a portion of the terminal area TA may be disposed in an area PA protruding from the heating part 332 in the second direction.

Figure 14B:
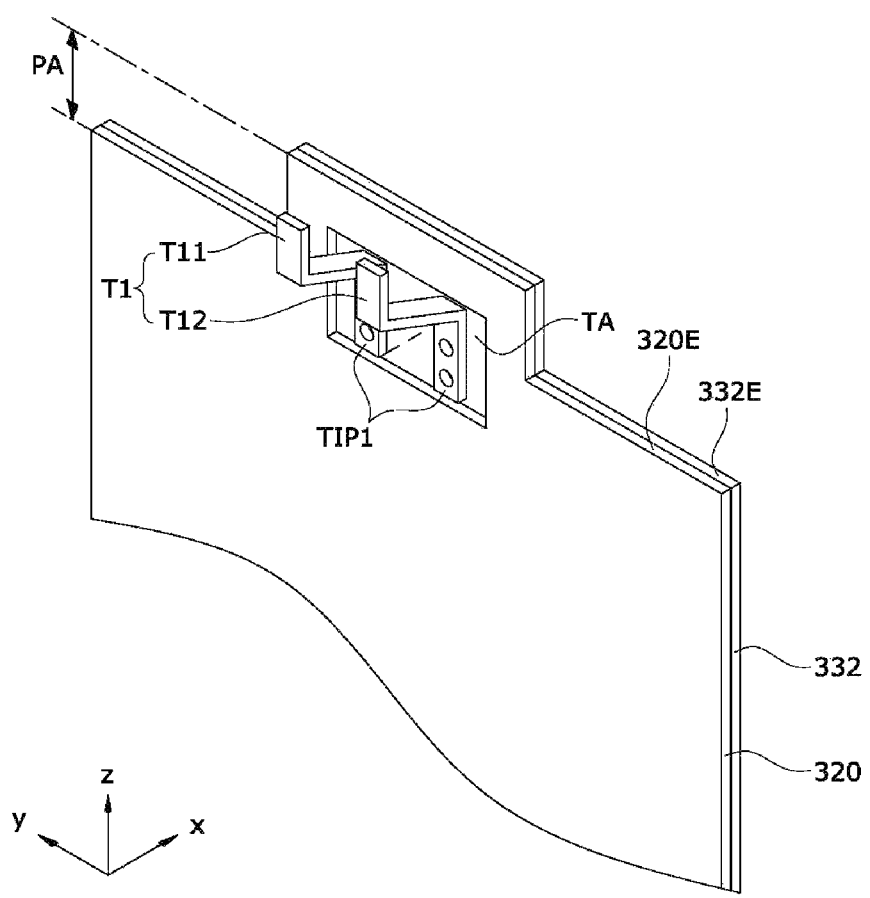

Thereafter, the pair of first heater terminals T11 and T12 shown in FIG. 14A is pressed in the first direction indicated by the arrow AR2, so the end T1P1 of each of the first heater terminals T11 and T12 is brought into contact with the terminal area TA, as shown in FIG. 14B.

Figure 14C:
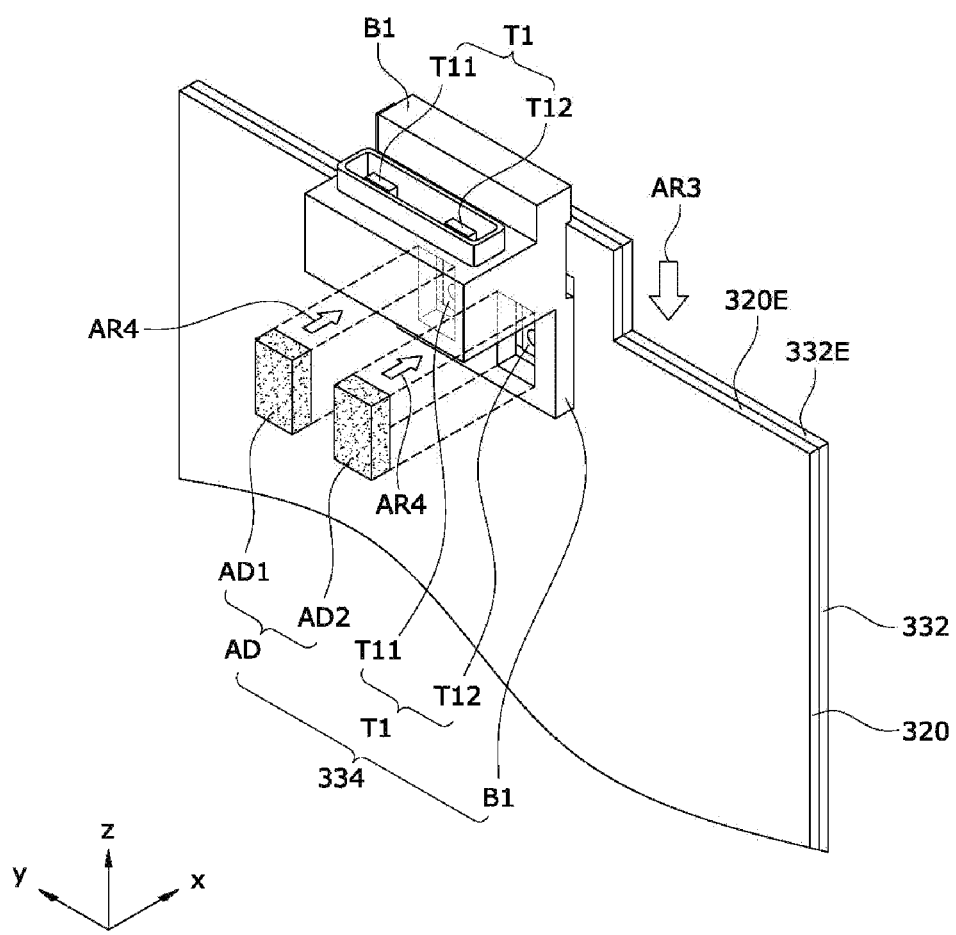

Thereafter, the first body B1 is pressed in the second direction indicated by the arrow AR3 so as to surround the pair of first heater terminals T11 and T12, as shown in FIG. 14C. In this case, a space in the first body B1 in which the first terminal body T1P3 of each of the first heater terminals T11 and T12 is disposed may be an empty hollow portion.

Figure 14D:
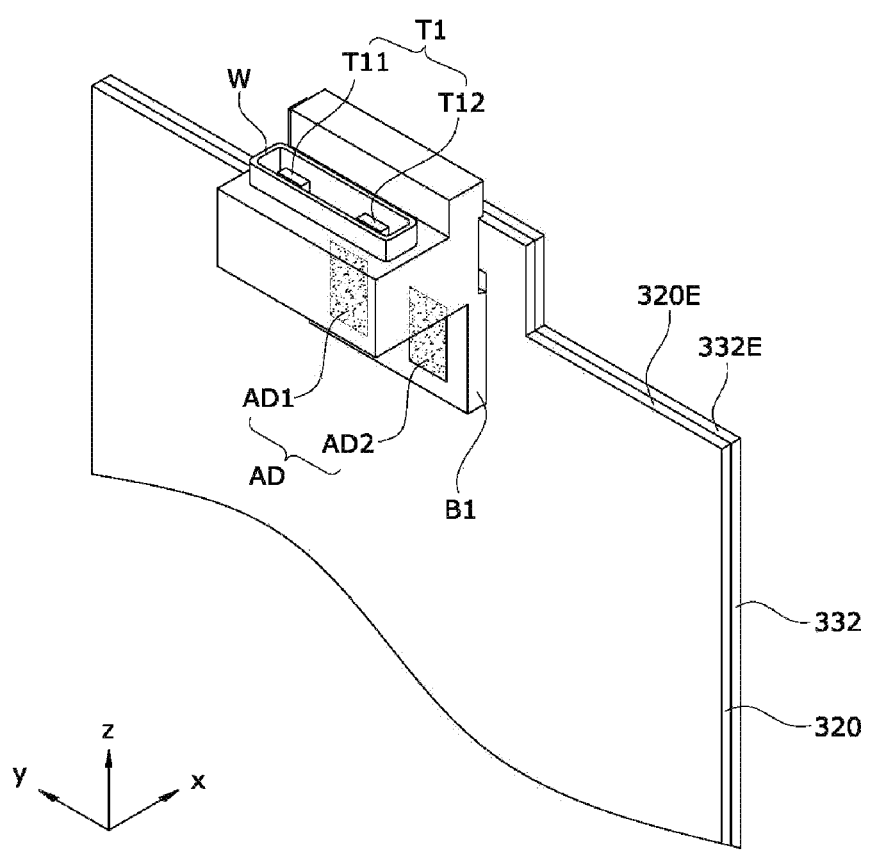

Thereafter, the adhesive member AD shown in FIG. 14C is pressed in the first direction indicated by the arrow AR4, thereby fixing the first terminal T1 to the terminal area TA, as shown in FIG. 14D. That is, the first adhesive member AD1 shown in FIG. 14C is pressed in the first direction indicated by the arrow AR4 in order to fix the end T1P1 of one T11 of the first heater terminals T11 and T12 to the terminal area TA, and the second adhesive member AD2 shown in FIG. 14C is pressed in the first direction indicated by the arrow AR4 in order to fix the end T1P1 of the other T12 of the first heater terminals T11 and T12 to the terminal area TA, thereby completing manufacture of the first connector 334.

Figure 14E:
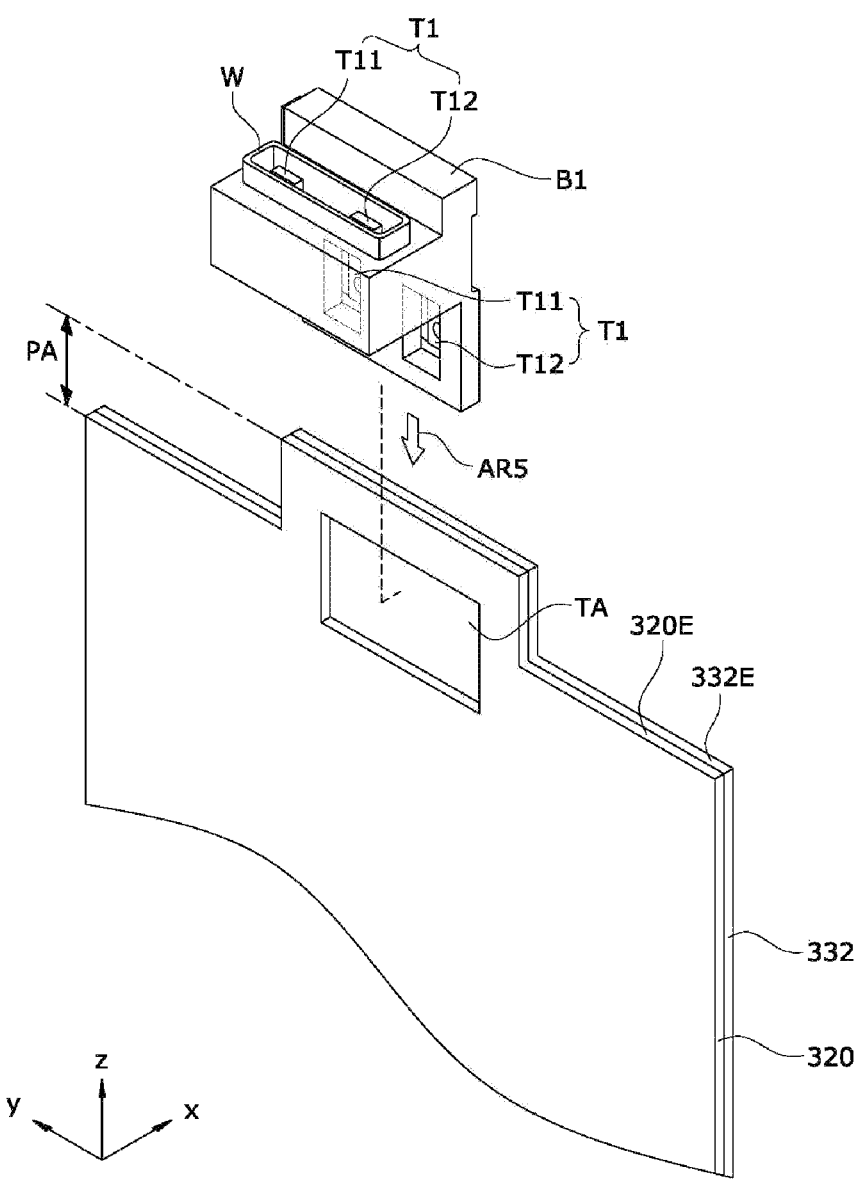

According to another embodiment, as shown in FIG. 14E, a first body B1 in which the first terminal T1 is already formed is prepared. In this case, at least a portion of each of the first heater terminals T11 and T12 may be embedded in the first body B1. For example, the first terminal T1 and the first body B1 may be integrated with each other through an injection molding process.

To this end, the first body B1 may further include a support portion (not shown) in which at least a portion of each of the first heater terminals T11 and T12 is embedded through an injection molding process.

Thereafter, the first body B1 shown in FIG. 14E is pressed in the second direction indicated by the arrow AR5, so the first body B1 is mounted on the edges 320E and 332E of the pad 320 and the heating part 332, as shown in FIG. 14C.

Subsequent processes are the same as those of the manufacturing method according to the embodiment described above with reference to FIGS. 14C and 14D.

Hereinafter, a method of manufacturing the second connector 350 will be described with reference to the accompanying drawings.

Figure 15A:
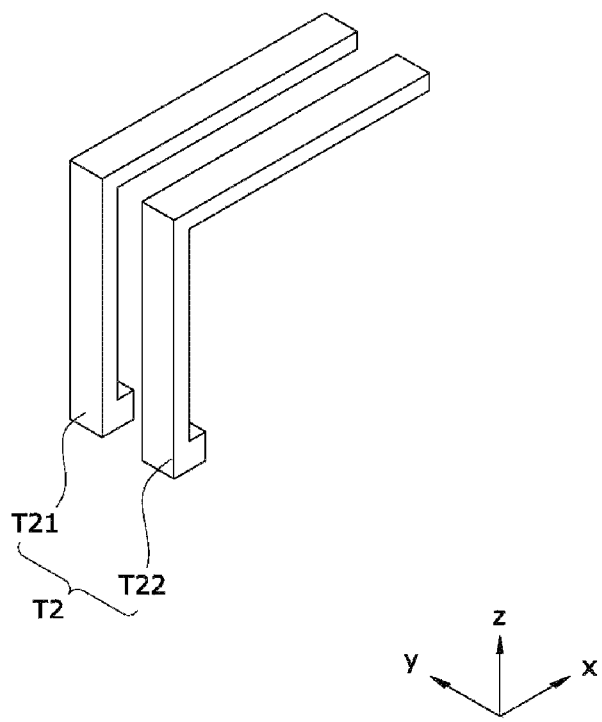
FIGS. 15A, 15B and 15C are perspective views for explaining processes of a method of manufacturing the second connector according to an exemplary embodiment of the present disclosure.
Figure 15B:
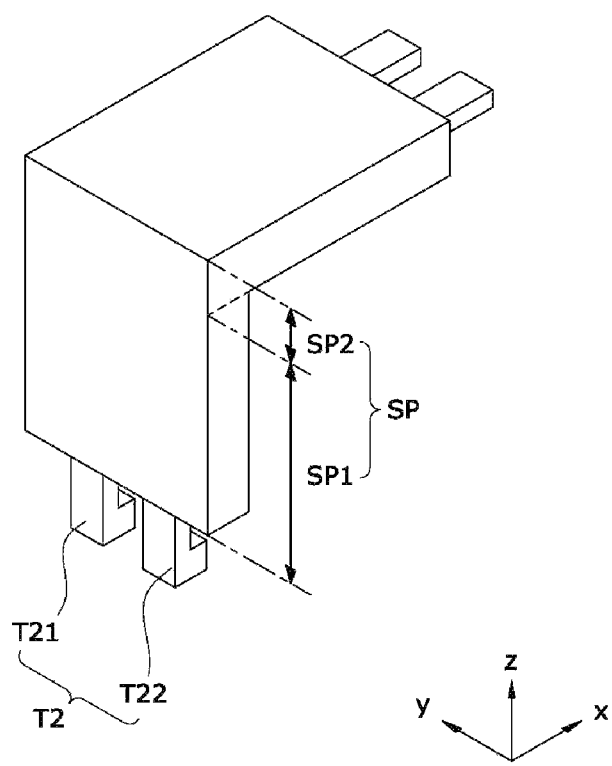
Figure 15C:
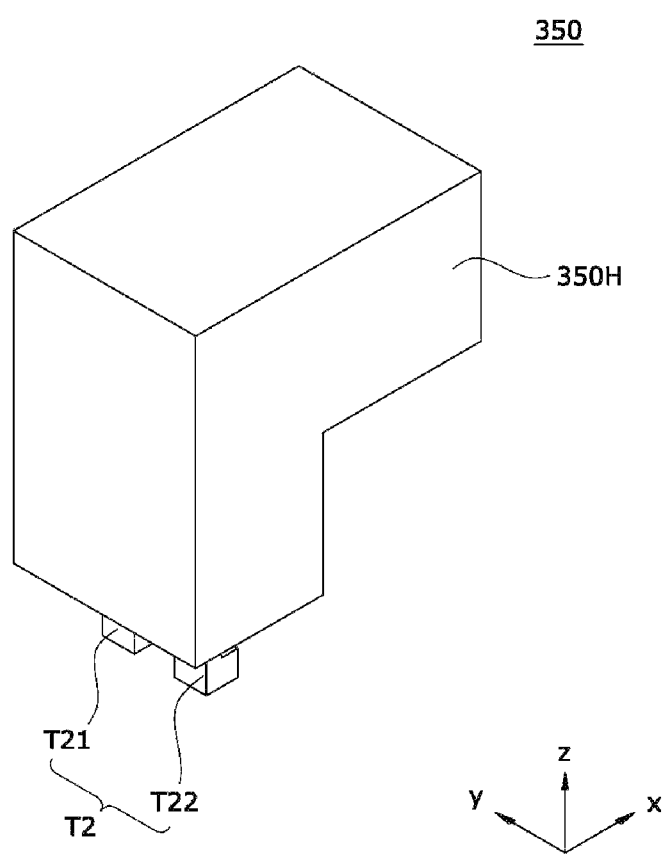

FIGS. 15A to 15C are perspective views for explaining processes of a method of manufacturing the second connector 350 according to an embodiment.

Referring to FIG. 15A, the pair of second heater terminals T21 and T22 is prepared.

Thereafter, referring to FIG. 15B, at least a portion of each of the pair of second heater terminals T21 and T22 is embedded in the support portion SP through an injection molding process.

Thereafter, as shown in FIG. 15C, a housing 350H is provided so as to accommodate the support portion SP and the pair of second heater terminals T21 and T22 through an injection molding process such that the connection portion T2P3 is exposed and the other portions T2P1, T2P2, T2P4, T2P7, and T22 are not exposed. Thereafter, the gasket 352 is inserted into the housing, thereby completing manufacture of the second connector 350.

When the housing 350H shown in FIG. 15C is formed so as to accommodate the pair of second heater terminals T21 and T22 shown in FIG. 15A, the pair of second heater terminals T21 and T22 may be warped during the injection molding process shown in FIG. 15C. Therefore, in order to prevent this problem, the pair of second heater terminals T21 and T22 is embedded into the support portion SP, as shown in FIG. 15B, before the housing 350H is formed so as to accommodate the second heater terminals T21 and T22 shown in FIG. 15A.

Hereinafter, a fuel cell vehicle 400 including the fuel cell 100 according to the embodiment will be described with reference to the accompanying drawings.

Figure 16:
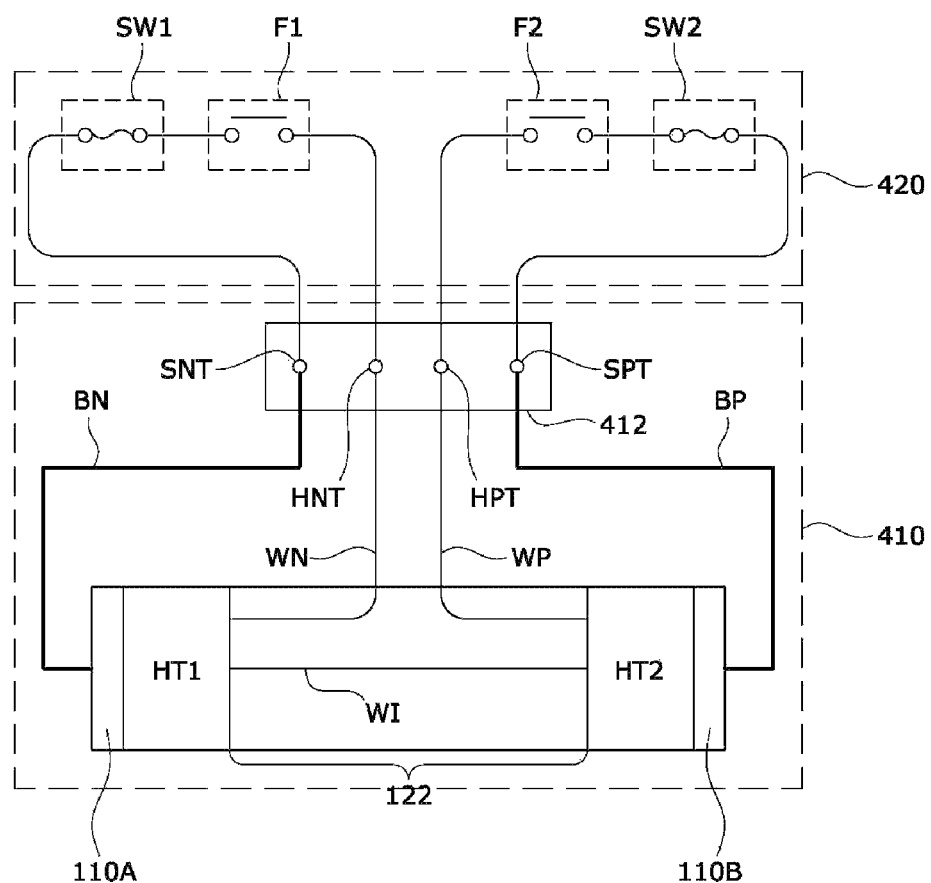
FIG. 16 is a block diagram of a fuel cell vehicle according to an exemplary embodiment of the present disclosure.
Figure 17A:
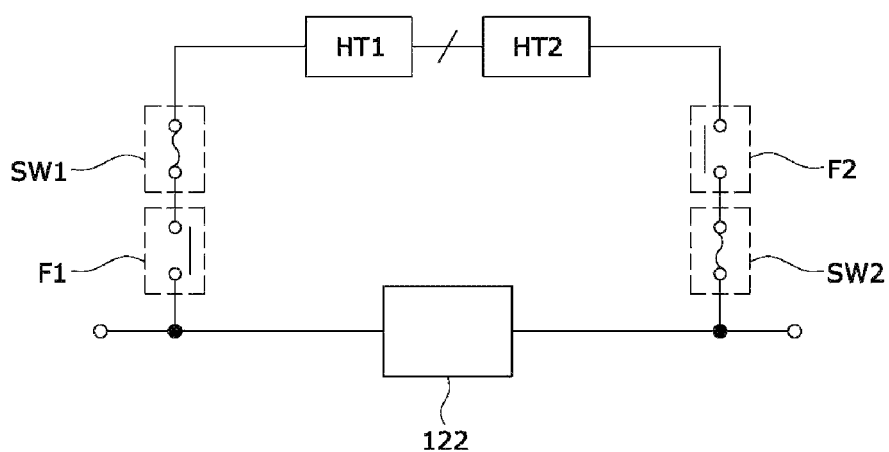
FIGS. 17A and 17B are circuit diagrams of the fuel cell vehicle shown in FIG. 16.
Figure 17B:
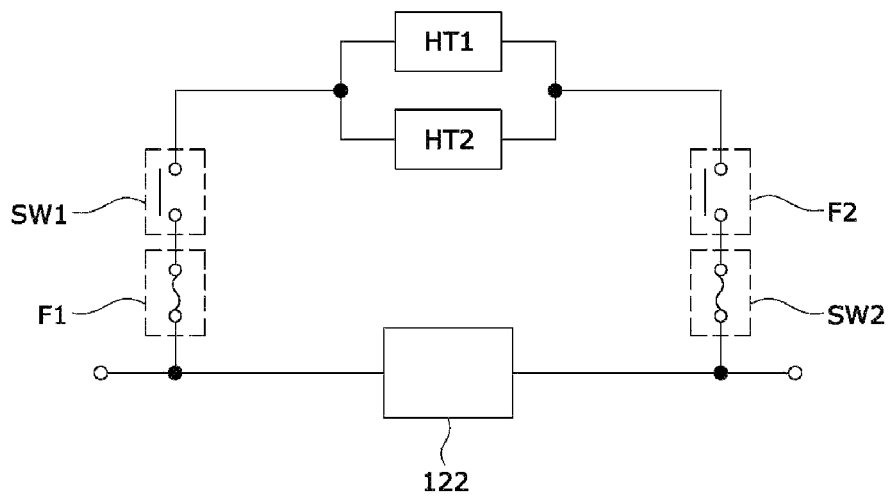

FIG. 16 is a block diagram of a fuel cell vehicle 400 according to an embodiment, and FIGS. 17A and 17B are circuit diagrams of the fuel cell vehicle shown in FIG. 16. FIG. 17A illustrates a circuit in which first and second heaters HT1 and HT2 are connected to each other in series, and FIG. 17B illustrates a circuit in which first and second heaters HT1 and HT2 are connected to each other in parallel.

As in the above-described embodiment, when the fuel cell 100 includes one cell stack 122, an element (e.g., a stack bus bar (not shown) connected to the cell stack 122) for supplying a driving signal (or power) is connected to the above-described wire 360, and thus the second terminal T2 of the second connector 350 receives the driving signal. This driving signal is provided to the heating part 332 through the first terminal T1 of the first connector 334, which is connected to the second terminal T2 of the second connector 350, and thus the heating part 332 generates heat. Accordingly, the cell stack 122 may be heated.

Alternatively, unlike the above-described embodiment, the fuel cell 100 may include a plurality of cell stacks.

The fuel cell vehicle 400 shown in FIG. 16 may include a fuel cell 410 and a junction box (or a high-voltage junction box) 420.

The fuel cell 410 may include a cell stack 122, first and second heaters HT1 and HT2, first and second end plates 110A and 110B, a terminal block 412, a positive bus bar BP, a negative bus bar BN, a positive wire WP, a negative wire WN, and an intermediate wire WI.

Since the cell stack 122 corresponds to the cell stack 122 shown in FIG. 2, a description thereof will be omitted.

The first and second heaters HT1 and HT2 may be disposed at respective ends of the cell stack 122. The first and second heaters HT1 and HT2 may have the same configurations as and perform the same operations as the first and second heater assemblies 300A and 300B shown in FIG. 2, respectively. Thus, a description of each of the first and second heaters HT1 and HT2 will be omitted.

In addition, the first and second end plates 110A and 110B may have the same configurations as and perform the same operations as the first and second end plates 110A and 110B shown in FIG. 2, respectively. Thus, a description of each of the first and second end plates 110A and 110B will be omitted.

The terminal block 412 serves to electrically connect the first and second heaters HT1 and HT2 and the cell stack 122 to the junction box 420. For example, the terminal block 412 may protrude from the upper surface of the fuel cell 410 toward the junction box 420, and may be electrically connected to the junction box 420.

The terminal block 412 may include a positive bus terminal SPT, a negative bus terminal SNT, a positive heater terminal HPT, and a negative heater terminal HNT.

The positive bus terminal SPT may be connected to the positive bus bar BP, the negative bus terminal SNT may be connected to the negative bus bar BN, the positive heater terminal HPT may be connected to the positive wire WP, and the negative heater terminal HNT may be connected to the negative wire WN. To this end, conductive wires may also be disposed in the terminal block 412.

In this case, for convenience of description, the current collector that is in contact with the first heater HT1 will be referred to as a "first current collector", and the current collector that is in contact with the second heater HT2 will be referred to as a "second current collector".

In this case, the negative bus bar BN may electrically connect the first current collector to the negative bus terminal SNT of the terminal block 412, and the positive bus bar BP may electrically connect the second current collector to the positive bus terminal SPT of the terminal block 412.

In addition, the positive wire WP may electrically connect the second heater HT2 to the positive heater terminal HPT of the terminal block 412, and the negative wire WN may electrically connect the first heater HT1 to the negative heater terminal HNT of the terminal block 412.

The intermediate wire WI may electrically connect the heaters HT1 and HT2 of the cell stack 122 to each other.

The junction box 420 may be disposed above the cell stack 122. The current collector may collect electrical energy generated by the flow of electrons in the cell stack 122, and may transmit the collected electrical energy to the junction box 420. The power transmitted to the junction box 420 may be supplied to a load of the fuel cell vehicle 400 that uses the fuel cell 410.

The junction box 420 may serve to receive and distribute the power generated from the fuel cell 410. To this end, the junction box 420 may be electrically connected to the fuel cell 410 via the terminal block 412.

In addition, the junction box 420 may include first and second switching units. The first switching unit may be disposed between the negative wire WN and the negative bus bar BN, and the second switching unit may be disposed between the positive wire WP and the positive bus bar BP. The first switching unit may include a first switch SW1 and a first fuse F1, and the second switching unit may include a second switch SW2 and a second fuse F2. Referring to FIGS. 17A and 17B, when the first and second switching units are switched on, that is, when the first and second switches SW1 and SW2 are switched on, current is supplied to the first and second heaters HT1 and HT2, whereby a closed loop is formed. Accordingly, the first and second heaters HT1 and HT2 may generate heat. In this case, the first and second fuses F1 and F2 serve to block overcurrent.

In addition, when it is intended to interrupt generation of heat by the first and second heaters HT1 and HT2, the first and second switching units are switched off, that is, the first and second switches SW1 and SW2 are switched off.

Hereinafter, a fuel cell according to a comparative example and the fuel cell according to the embodiment will be described with reference to the accompanying drawings.

An example of a fuel cell according to a comparative example is disclosed in Korean Patent Laid-Open Publication No. 10-2018-0088095.

In the case of the fuel cell according to the disclosed comparative example, a second negative terminal 511 and a second positive terminal 512 are coupled and fixed to a body 100b of a bypass plate 100 so as to be integrated therewith. In contrast, in the fuel cell according to the embodiment, the second connector 530 including the second terminal T2, which performs a function corresponding to the second negative terminal 511 and the second positive terminal 512 of the comparative example, is not fixed to the heater plate 310. That is, the second connector 530 is provided separately from the first connector 334, and thus is detachably coupled to the first connector 334.

In addition, in the fuel cell according to the comparative example, the first positive terminal and the first negative terminal are disposed inside a heating element 300. For this reason, the first positive terminal and the first negative terminal may be overheated by the heat generated by the heating element 300, thereby deteriorating electrical stability. In addition, in the fuel cell according to the comparative example, because not only the first positive and negative terminals but also the second positive and negative terminals are exposed, there is a possibility of electrical insulation becoming degraded.

In contrast, according to the fuel cell according to the embodiment, in the first terminal T1, which performs a function corresponding to the first positive terminal and the first negative terminal of the comparative example, only the end T1P1 is in contact with the terminal area TA of the heating part 332, and the opposite end T1P2 is located outside the edge 332E, rather than being in contact with the heating part 332. Therefore, compared to the comparative example in which the entire area of each of the first positive terminal and the first negative terminal are in contact with the heating element 300, the embodiment in which only a portion of the first terminal T1 is in contact with the heating part 332 has a relatively large heat generation area, and thus has improved heat generation performance.

In addition, since only the end T1P1 of the first terminal T1, rather than the entirety thereof, is in contact with the heating part 332, the possibility of the first terminal T1 being overheated by the heat generated by the heating part 332 is lowered compared to the comparative example, and thus the embodiment has improved electrical stability. In addition, since the first terminal T1 is protected from the heat generated by the heating part 332 by the partition wall W, electrical stability may be further improved.

In addition, in the fuel cell according to the comparative example, the heating element 300 is coupled to the bypass plate 100b in the thickness direction, the first negative terminal and the second negative terminal are coupled to the bypass plate 100b in the longitudinal direction, and the first positive terminal and the second negative terminal are coupled to the bypass plate 100b in the longitudinal direction. For this reason, the second negative terminal and the second positive terminal, which are fixed to the bypass plate, are respectively coupled to the first negative terminal and to the first positive terminal, which are fixed to the heating element 300, in a diagonal direction intermediate to the longitudinal direction and the thickness direction by tilting the bypass plate or the heating element. Accordingly, the first negative terminal and the second negative terminal may be abnormally coupled to each other, or the first positive terminal and the second positive terminal may be abnormally coupled to each other, which may lead to deterioration in contact stability, complicate manufacturing processes, and make it difficult to automate manufacturing processes.

In contrast, according to the embodiment, the heating element 330 having the first connector 334 is coupled to the plate 110A, 110B, or 310 in the first direction, and then the second connector 350, which is provided separately, is coupled to the first connector 334 in the second direction intersecting the first direction. Accordingly, it is not necessary to couple the first terminal T1 and the second terminal T2 to each other in the diagonal direction, thus eliminating the possibility of abnormal coupling of the first terminal T1 and the second terminal T2. As a result, contact stability may be ensured, automation of manufacturing processes may be realized, and manufacturing processes may be simplified.

In the fuel cell according to the embodiment, since the first coupling portion CP1 of the first connector 334 and the second coupling portion CP2 of the second connector 350 are tightly coupled to each other in a fitting manner, the first and second connectors 334 and 350 have a watertight structure, thereby preventing the first and second terminals T1 and T2 from being exposed to external dust or moisture, thus ensuring electrical insulation. In addition, since the gasket 352 is disposed at the portion at which the first connector 334 and the second connector 350 are coupled to each other, the first and second connectors 334 and 350 may be more tightly coupled to each other, and thus electrical stability may be further improved.

As is apparent from the above description, the fuel cell according to the embodiment may have improved electrical stability and heat generation performance. In addition, contact stability may be ensured, automation of manufacturing processes may be realized, and manufacturing processes may be simplified.

However, the effects achievable through the disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other. In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell, comprising:
   a cell stack comprising a plurality of unit cells stacked in a first direction;
   a plate disposed on at least one of two end portions of the cell stack;
   a heating element disposed between the at least one of the two end portions of the cell stack and the plate, the heating element comprising a first connector including a first terminal protruding in a second direction intersecting the first direction, the first connector being coupled to the plate in the first direction; and a second connector including a second terminal, the second terminal being coupled to the first connector in the second direction and configured to be electrically connected to the first terminal, wherein the heating element further comprises a heating part connected to the first connector and configured to generate heat, wherein the heating part comprises a first surface facing the plate and a second surface facing opposite the first surface, wherein the first terminal has an end contacting a terminal area located at a peripheral portion of the first surface, and wherein the first connector further comprises:
a first body including a first portion having a recess formed therein to connect at least a portion of the terminal area to the first terminal in the first direction and a second portion having a first receiving recess formed therein to receive an opposite end of the first terminal protruding in the second direction, the second portion being adjacent to the first portion in the second direction.

2. The fuel cell according to claim 1,
wherein the first connector is mounted to an edge of the heating part, and
wherein at least a portion of the first terminal protrudes further than the edge of the heating part in the second direction.

3. The fuel cell according to claim 2,
wherein the first connector further comprises:
an adhesive member inserted into the recess to fix the first body to the heating part.

4. The fuel cell according to claim 3, wherein the opposite end of the first terminal is located farther away from the first surface of the heating part than the end in the first direction, and
wherein the first terminal comprises a first terminal body connecting the end to the opposite end and disposed in the first body.

5. The fuel cell according to claim 3, further comprising:
an insulation pad disposed on the first surface of the heating part so as to connect the at least a portion of the terminal area to the first terminal.

6. The fuel cell according to claim 5, wherein each of the first and second portions of the first body is in contact with the insulation pad to trap the adhesive member in the recess.

7. The fuel cell according to claim 1, wherein the second connector is detachably coupled to the first connector.

8. The fuel cell according to claim 3, wherein the plate comprises:
a second receiving recess receiving the first connector inserted thereinto in the first direction; and
an insertion portion allowing the second connector to be inserted into the first receiving recess of the first connector, received in the second receiving recess, from outside the plate in the second direction.

9. The fuel cell according to claim 8, wherein the plate further comprises:
a first area overlapping the first portion of the first body in the first direction; and
a second area disposed adjacent to the first area and overlapping the second portion of the first body in the first direction, the second area being stepped with respect to the first area to define the insertion portion, and wherein the first portion has a third surface facing the first area, and the second portion has a fourth surface facing the second area and stepped with respect to the third surface.

10. The fuel cell according to claim 8, wherein the plate further comprises:
an end plate; and
a heater plate disposed between the end plate and the at least one of the two end portions of the cell stack, and
wherein the second receiving recess is included in the heater plate.

11. The fuel cell according to claim 10, wherein the end plate and the heater plate are integrated with each other.

12. The fuel cell according to claim 3, wherein the second connector further comprises:
a second body including:
a third portion having:
a portion of a support portion; and
a third receiving recess defined from an end of the portion of the support portion in the second direction; and
a fourth portion, the fourth portion including:
a remaining portion of the support portion; and
a fourth receiving recess defined from an end of the remaining portion of the support portion bent in the first direction from the third portion, and
wherein the second terminal comprises:
a second terminal body including:
a first embedded portion, embedded in the portion of the support portion in the third portion;
a first protruding portion, protruding from the first embedded portion in the second direction and received in the third receiving recess; and
a connection portion, extending from the first protruding portion in the second direction and connected to the opposite end of the first terminal; and
a third terminal body including:
a second embedded portion, bent and extending in the first direction from the second terminal body and embedded in the remaining portion of the support portion in the fourth portion; and
a second protruding portion, protruding from the second embedded portion in the first direction and received in the fourth receiving recess.

13. The fuel cell according to claim 12, wherein the second connector further comprises:
a gasket disposed at the end of the portion of the support portion, the end of the portion of the support portion being contiguous with the third receiving recess in the third portion.

14. The fuel cell according to claim 12, wherein the second portion of the first body further comprises a first coupling portion, and
wherein the third portion of the second body comprises a second coupling portion coupled to the first coupling portion in the second direction in a fitting manner.

15. The fuel cell according to claim 14, wherein the first coupling portion comprises:
a partition wall protruding in the second direction to define the first receiving recess and surrounding the opposite end of the first terminal;
a first recess disposed near the partition wall; and
a stepped portion disposed near the partition wall to define a second recess together with the plate, and
wherein the second coupling portion comprises coupling members defining the third receiving recess and coupled to the first recess and the second recess in a fitting manner.

16. The fuel cell according to claim 12, further comprising:
a wire coupled to the second protruding portion in a female-male coupling manner.

17. The fuel cell according to claim 16, wherein the wire includes an end portion coupled to the fourth receiving recess in a fitting manner.

18. The fuel cell according to claim 16, wherein the wire is integrated with the second connector.

19. The fuel cell according to claim 1, wherein one of the first terminal and the second terminal comprises a pair of male heater terminals protruding in the second direction, and
wherein a remaining one of the first terminal and the second terminal comprises a pair of female heater terminals receiving the pair of male heater terminals inserted thereinto.

* * * * *